US010575128B2

(12) United States Patent
Suzuki et al.

(10) Patent No.: US 10,575,128 B2
(45) Date of Patent: Feb. 25, 2020

(54) MANAGEMENT DEVICE, MANAGEMENT METHOD, AND TERMINAL DEVICE FOR DISPLAYING ADDITIONAL INFORMATION ON IMAGE AND DISPLAYING IMAGE

(71) Applicant: JVC KENWOOD Corporation, Yokohama-shi, Kanagawa (JP)

(72) Inventors: Fuminori Suzuki, Yokohama (JP); Ichiro Shishido, Yokohama (JP); Tomonori Nagahama, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 0 days.

(21) Appl. No.: 15/899,649

(22) Filed: Feb. 20, 2018

(65) Prior Publication Data

US 2018/0242110 A1   Aug. 23, 2018

(30) Foreign Application Priority Data

Feb. 20, 2017 (JP) ................... 2017-028950
Feb. 20, 2017 (JP) ................... 2017-028951
Feb. 20, 2017 (JP) ................... 2017-028952

(51) Int. Cl.
*H04W 24/00* (2009.01)
*H04W 4/024* (2018.01)
*H04B 17/15* (2015.01)
*H04W 4/02* (2018.01)

(52) U.S. Cl.
CPC ............ *H04W 4/024* (2018.02); *H04B 17/15* (2015.01); *H04W 4/025* (2013.01)

(58) Field of Classification Search
USPC ..................... 455/456.1, 407, 408
See application file for complete search history.

(56) References Cited

U.S. PATENT DOCUMENTS

| 2002/0193942 | A1* | 12/2002 | Odakura ............... G01S 19/13 701/431 |
| 2010/0022263 | A1* | 1/2010 | Stamoulis ............ H04W 24/02 455/501 |
| 2015/0111598 | A1* | 4/2015 | Azami .................. H04W 64/00 455/456.1 |
| 2016/0105807 | A1* | 4/2016 | Yadav .................... H04W 4/02 455/456.1 |
| 2017/0265038 | A1* | 9/2017 | Lin ...................... H04W 64/00 |

FOREIGN PATENT DOCUMENTS

JP      2012-221330 A    11/2012
JP      6363434 B2 *     7/2018

* cited by examiner

*Primary Examiner* — David Q Nguyen
(74) *Attorney, Agent, or Firm* — Brundidge & Stanger, P.C.

(57) ABSTRACT

A determination unit refers to position information of a terminal device registered in a given base station device to determine ease of connection to another base station device. A generator generates, for the terminal device, guidance information to prompt the terminal device to move to a position where a likelihood of connection to the other base station device is increased, based on a result of determination in the determination unit. A transmitter transmits the guidance information generated in the generator to the terminal device.

11 Claims, 32 Drawing Sheets

FIG.6A

| BASE STATION DEVICE | POSITION REGISTRATION COUNT | PERMITTED VALUE |
|---|---|---|
| FIRST BASE STATION DEVICE | 140 | 100 |
| SECOND BASE STATION DEVICE | 50 | 100 |
| THIRD BASE STATION DEVICE | 70 | 100 |

| BASE STATION DEVICE | ADJACENT BASE STATION DEVICE |
|---|---|
| FIRST BASE STATION DEVICE | SECOND BASE STATION DEVICE |
| | THIRD BASE STATION DEVICE |
| SECOND BASE STATION DEVICE | FIRST BASE STATION DEVICE |
| | THIRD BASE STATION DEVICE |
| THIRD BASE STATION DEVICE | FIRST BASE STATION DEVICE |
| | SECOND BASE STATION DEVICE |

| BASE STATION DEVICE ID | TERMINAL DEVICE ID | POSITION INFORMATION | RSSI INFORMATION | TIME AND DATE |
|---|---|---|---|---|
| FIRST BASE STATION DEVICE | 15 | X1,Y1 | R1 | T1 |
| | 33 | X2,Y2 | R2 | T2 |
| | 35 | X3,Y3 | R3 | T3 |
| | ⋮ | ⋮ | ⋮ | ⋮ |
| SECOND BASE STATION DEVICE | 7 | X4,Y4 | R4 | T4 |
| | 31 | X5,Y5 | R5 | T5 |
| | ⋮ | ⋮ | ⋮ | ⋮ |
| THIRD BASE STATION DEVICE | ⋮ | ⋮ | ⋮ | ⋮ |

| BASE STATION DEVICE | LATITUDE | LONGITUDE | COMMUNICATION ENABLED AREA INFORMATION (RADIUS) |
|---|---|---|---|
| FIRST BASE STATION DEVICE | 35.****** | 139.****** | 10km |
| SECOND BASE STATION DEVICE | 35.****** | 139.****** | 5km |
| THIRD BASE STATION DEVICE | 35.****** | 139.****** | 8km |

| BASE STATION DEVICE | GROUP NUMBER | POSITION REGISTRATION COUNT | LOWER LIMIT VALUE |
|---|---|---|---|
| FIRST BASE STATION DEVICE | 1 | 30 | 10 |
| | 2 | 5 | 10 |
| | 3 | 5 | 10 |
| SECOND BASE STATION DEVICE | 2 | 30 | 10 |
| | 3 | 5 | 10 |
| THIRD BASE STATION DEVICE | 1 | 5 | 10 |
| | 2 | 5 | 10 |
| | 3 | 30 | 10 |

| BASE STATION DEVICE ID | GROUP NUMBER | TERMINAL DEVICE ID |
|---|---|---|
| FIRST BASE STATION DEVICE | 1 | 15 |
| | | 33 |
| | | 35 |
| | | ⋮ |
| | 2 | 9 |
| | | 12 |
| | | ⋮ |
| | ⋮ | ⋮ |
| SECOND BASE STATION DEVICE | ⋮ | ⋮ |
| THIRD BASE STATION DEVICE | ⋮ | ⋮ |

| BASE STATION DEVICE | GROUP NUMBER | POSITION REGISTRATION COUNT | LOWER LIMIT VALUE |
|---|---|---|---|
| FIRST BASE STATION DEVICE | 1 | 30 | 10 |
| | 2 | 15 | 10 |
| | 3 | 15 | 10 |
| | 4 | 15 | 10 |
| | 5 | 15 | 10 |
| | 6 | 10 | 10 |
| | 7 | 10 | 10 |
| SECOND BASE STATION DEVICE | 1 | 15 | 10 |
| | 2 | 30 | 10 |
| | 3 | 15 | 10 |
| THIRD BASE STATION DEVICE | 3 | 30 | 10 |

| BASE STATION DEVICE | GROUP NUMBER | POSITION REGISTRATION COUNT | LOWER LIMIT VALUE |
|---|---|---|---|
| FIRST BASE STATION DEVICE | 1 | 30 | 10 |
|  | 2 | 15 | 10 |
|  | 3 | 15 | 10 |
| SECOND BASE STATION DEVICE | 1 | 15 | 10 |
|  | 2 | 30 | 10 |
|  | 3 | 15 | 10 |
| THIRD BASE STATION DEVICE | 1 | 15 | 10 |
|  | 2 | 15 | 10 |
|  | 3 | 30 | 10 |

| BASE STATION DEVICE | GROUP NUMBER | POSITION REGISTRATION COUNT | LOWER LIMIT VALUE |
|---|---|---|---|
| FIRST BASE STATION DEVICE | 1 | 30 | 10 |
| | 2 | 15 | 10 |
| | 3 | 15 | 10 |
| SECOND BASE STATION DEVICE | 1 | 15 | 10 |
| | 2 | 30 | 10 |
| | 3 | 15 | 10 |
| THIRD BASE STATION DEVICE | 1 | 15 | 10 |
| | 2 | 15 | 10 |
| | 3 | 30 | 10 |

| BASE STATION DEVICE | GROUP NUMBER | POSITION REGISTRATION COUNT | LOWER LIMIT VALUE |
|---|---|---|---|
| FIRST BASE STATION DEVICE | 1 | 30 | 10 |
| | 2 | 11 | 10 |
| | 3 | 17 | 10 |
| SECOND BASE STATION DEVICE | 1 | 12 | 10 |
| | 2 | 30 | 10 |
| | 3 | 13 | 10 |

60

MANAGEMENT DEVICE, MANAGEMENT METHOD, AND TERMINAL DEVICE FOR DISPLAYING ADDITIONAL INFORMATION ON IMAGE AND DISPLAYING IMAGE

CROSS-REFERENCE TO RELATED APPLICATION

This application is based upon and claims the benefit of priority from the prior Japanese Patent Application No. 2017-28950, filed on Feb. 20, 2017, Japanese Patent Application No. 2017-28951, filed on Feb. 20, 2017 and Japanese Patent Application No. 2017-28952, filed on Feb. 20, 2017, the entire contents of which are incorporated herein by reference.

BACKGROUND

1. Field

The present invention relates to visualization technology and, more particularly, to management device, management method, and terminal device for superimposing additional information on an image and displaying the image.

2. Description of the Related Art

Augmented reality (AR) technology enables superimposing various information on a captured image. For example, the positions of other communication terminals located around a communication terminal are displayed in a background image using the AR technology. Attributes of users using other communication terminals or information related to compatibility between users can also be displayed (e.g., patent document 1).
[patent document 1] JP2012-221330

Information on users using other communication terminals is displayed in a background image. It is therefore revealed where in the neighborhood of the communication terminal other users are located and which users are located in a manner easy to understand. However, information to guide terminal device to a proper position in consideration of the ease of connection or communication quality in a communication system has not been provided.

SUMMARY

To address the aforementioned issue, a management device according to an embodiment comprises: a determination unit that refers to position information of a terminal device registered in a given base station device to determine ease of connection to another base station device; and a generator that generates, for the terminal device, guidance information to prompt the terminal device to move to a position where a likelihood of connection to the other base station device is increased, based on a result of determination in the determination unit.

Another embodiment relates to a management method. The method is adapted for a management device, and comprises: referring to position information of a terminal device registered in a given base station device to determine ease of connection to another base station device; and generating, for the terminal device, guidance information to prompt the terminal device to move to the other base station device is increased, based on a result of determination.

Still another embodiment relates to a terminal device. The device is connected to a base station device, and comprises: a reception unit that receives guidance information to prompt the terminal device to move to a position where likelihood of connection to another base station device different from the base station device to which the terminal device is connected is increased; an imaging unit that captures an image of an environment surrounding the terminal device; a generation unit that generates display control information for displaying the guidance information received in the reception unit, superimposing the guidance information on the image of the environment surrounding the terminal device captured by the imaging unit; a controller that performs a connection process to connect to the other base station device, wherein the generation unit modifies the display control information in accordance with a status of connection process in the controller.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 6A-6B show a data structure of a database stored in the storage unit of FIG. 5;

FIG. 7 shows a data structure of another database stored in the storage unit of FIG. 5;

FIG. 10 shows a data structure of a database stored in the storage unit of FIG. 5;

FIG. 19 shows a data structure of the database stored in the storage unit according to embodiment 2;

FIG. 20 shows a database of another database registered in the storage unit according to embodiment 2;

FIG. 22 shows an example of data in a database stored in the storage unit according to embodiment 2;

FIG. 25 shows another example of data in a database stored in the storage unit according to embodiment 2;

FIG. 28 shows another example of data in a database stored in the storage unit according to embodiment 2;

FIG. 31 shows another example of data in a database stored in the storage unit according to embodiment 2.

DETAILED DESCRIPTION

Figure 1:
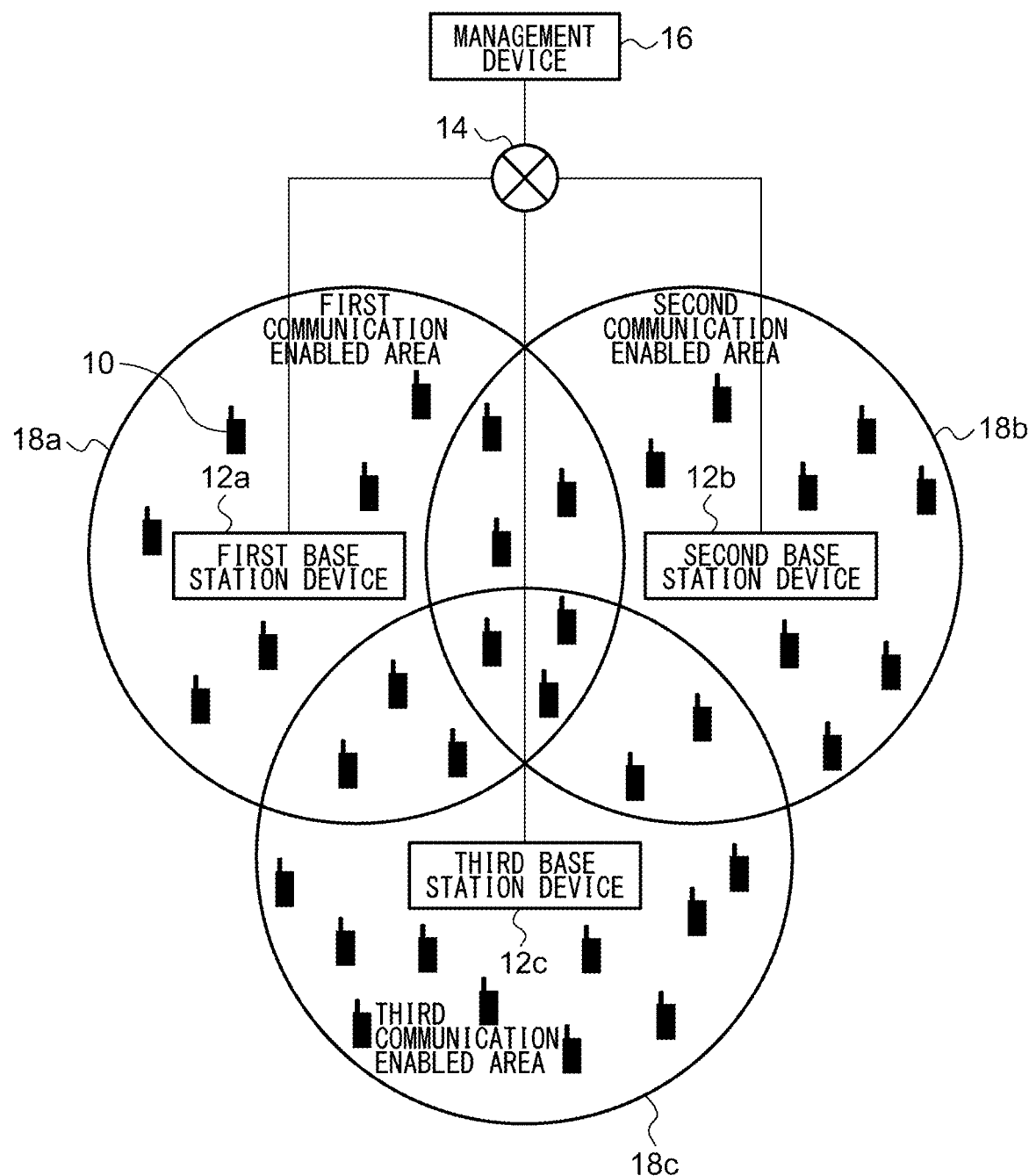
FIG. 1 shows a configuration of a communication system according to embodiment 1.

The invention will now be described by reference to the preferred embodiments. This does not intend to limit the scope of the present invention, but to exemplify the invention.

Embodiment 1

A summary will be given before describing the invention in specific details. Embodiment 1 relates to a communication system including a plurality of terminal devices configured to communicate with each other via a base station device. The communication system is exemplified by a business wireless system. One-to-one mode of communication or one-to-many mode of communication may be used. The latter represents group communication. The terminal device is provided with an imaging device and is capable of displaying augmented reality and acquiring Global Positioning System (GPS) information. The terminal device may be configured as a single device or as a combination of two or more devices. For clarity of description, it will be assumed that the former is the case.

In the latter case, the terminal device is implemented by, for example, a combination of a wireless device compatible with the business wireless system and a smartphone not compatible with the business wireless system. The wireless device and the smartphone can communicate with each other using a communication system different from the business wireless system so that the wireless device relays communication between the business wireless system and the smartphone. Further, the smartphone may be a device provided with an imaging device and capable of displaying augmented reality and acquiring Global Positioning System (GPS) information. Devices other than a smartphone may be used.

The terminal device connected to the base station device registers the position in the base station device and transmits the position information periodically. The managing device connected to the base station device has the knowledge of the situation of position registration of the terminal device in the base station device and also has the knowledge of the position information of the terminal device. Based on these information items, the management device provides (presents) information prompting the terminal device to move in a direction in which the load (resources used) on the communication system is reduced. For example, given that, of the two adjacent base station devices, that the first base station device is very congested and the second base station device is less congested, the management device selects, of the terminal devices connected to the first base station device, terminal devices having position information near the cover area of the second base station device. For example, terminal devices, for which a distance of movement to the cover area of the second base station device is of a predetermined value or smaller, or terminal devices, for which the time required to move to the cover area of the second base station device (estimated time) is of a predetermined value of smaller, are selected.

The management device instructs the selected terminal devices to move to the cover area of the second base station device. Information to prompt the terminal device to make a movement that will increase the likelihood of connection to the second base station device is indicated in the direction. Such information is referred to as guidance information. Meanwhile, the terminal device uses the guidance information received and the current position information measured to display a moving direction indicated by the guidance information on an image of an environment around. Therefore, the user of the terminal device can move to increase the likelihood of connection to the second base station device by viewing the displayed image.

FIG. 1 shows a configuration of a communication system 100. The communication system 100 includes: a plurality of terminal devices 10; a first base station device 12a, a second base station device 12b, and a third base station device 12c, which are generically referred to as base station devices 12; a network 14, and a management device 16. The number of base station devices 12 included in the communication system 100 may not be limited to "3". A larger or smaller number of base station devices may be included. The management device 16 is connected to each of the plurality of base station devices 12 via the network 14.

As described above, the plurality of terminal devices 10 and the plurality of base station devices 12 are compatible with the business wireless system. Each terminal device 10 performs speech communication and data communication via one of the base station devices 12. Each base station device 12 forms a communication enabled area 18 as a cover area. In this case, the first base station device 12a forms a first communication enabled area 18a, the second base station device 12b forms a second communication enabled area 18b, and the third base station device 12c forms a third communication enabled area 18c. The first communication enabled area 18a through the third communication enabled area 18c mutually overlap in part. A given one terminal device 10 transmits to another terminal device 10 via the base station device 12 in one-to-one mode of communication. Alternatively, a given one terminal device 10 may transmit to a plurality of other terminal devices 10 via the base station device 12 in one-to-many mode of communication. It is assumed that one-to-one communication is performed in embodiment 1.

If the number of terminal devices 10 for which the position is registered in any base station device 12 grows large, the resources (resource volume) used in the base station device 12 is increased and the traffic volume in the base station device 12 is increased. From the perspective of the operability of the communication system 100, it is preferred that the resources used in the base station devices 12 and the traffic volumes in the base station devices 12 be as even as possible. Guidance information to achieve this is generated in the management device 16 and transmitted to the terminal devices 10. The terminal device 10 receiving the guidance information presents the guidance information to the user in a manner easy to understand. The presentation is implemented by, for example, an application program run in the terminal device 10.

Figure 2:
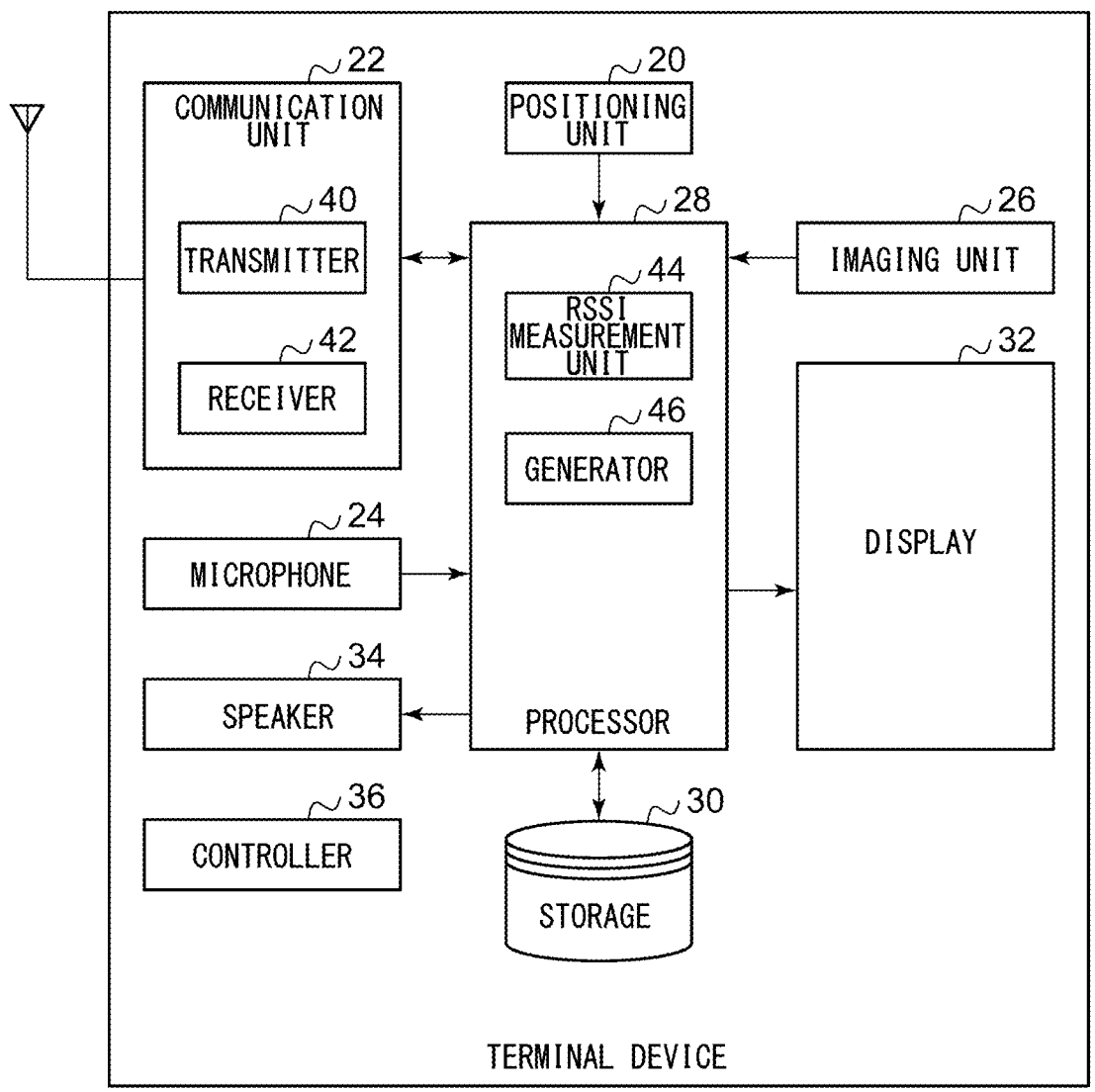
FIG. 2 shows a configuration of the terminal device of FIG. 1.

FIG. 2 shows a configuration of the terminal device 10. The terminal device 10 includes a positioning unit 20, a communication unit 22, a microphone 24, an imaging unit 26, a processor 28, a storage unit 30, a display unit 32, a speaker 34, and a controller 36. The communication unit 22 includes a transmitter 40 and a receiver 42. The processor 28 includes an RSSI measurement unit 44 and a generator 46.

The communication unit 22 is compatible with, for example, the business wireless system and communicates with another terminal device 10 via the base station device 12. The communication unit 22 also communicates with the management device 16 via the base station device 12. For connection to the base station device 12, the communication unit 22 registers the position in the base station device 12. For registration of the position, a publicly known technology may be used so that a description thereof is omitted.

The transmitter 40 of the communication unit 22 transmits the sound or data from the processor 28 to the base station device 12. The receiver 42 receives the sound or data from the base station device 12 and outputs the sound or data to the processor 28. The receiver 42 also receives a signal from the management device 16 via the base station device 12. The signal includes guidance information, i.e., information to prompt a movement to a position where the likelihood of connection to another base station device 12 different from the base station device 12 currently used by the terminal device 10 is increased. The information to prompt a movement is, for example, guidance position, guidance direction, or guidance route. The receiver 42 outputs the guidance information to the processor 28.

The positioning unit 20 identifies the position where the terminal device 10 is located by receiving a signal from a GPS satellite (not shown). The position is indicated by, for example, latitude, longitude, and altitude. For GPS positioning, a publicly known technology may be used so that a description thereof is omitted. In addition to the position, the moving speed and moving direction may be detected. The positioning unit 20 is provided with a function of electronic compass and identifies the direction that the terminal device 10 currently faces. The positioning unit 20 outputs these items of information (hereinafter, referred to as "position information") to the processor 28. The microphone 24 receives an input of sound and outputs the sound to the processor 28 as digital data. The speaker 34 receives an input of digital data from the processor 28 and outputs sound accordingly.

Figure 3:
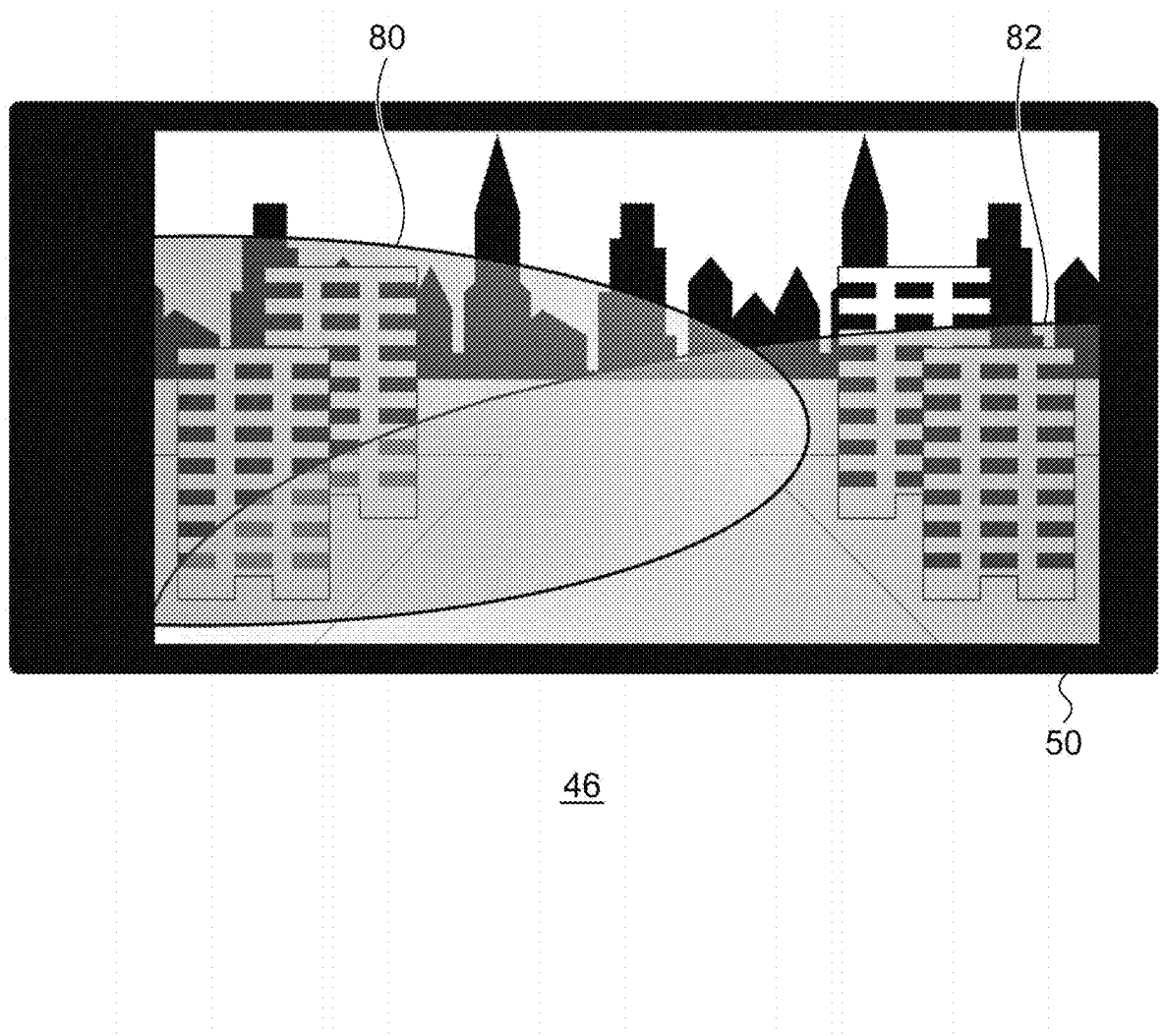
FIG. 3 shows an exemplary image generated in the generator of FIG. 2.

The imaging unit 26 captures an image of the environment surrounding the terminal device 10. The surrounding environment corresponds to the scenery around the terminal device 10. It should be noted that the image may be a still image or moving images. The imaging unit 26 outputs the captured image to the processor 28. The output image may be digital data. The image as digital data is also referred to as "image". The storage unit 30 described later is capable of storing the radio filed intensity of the base station device 12 transmitted from another terminal device 10. The display unit 32 is capable of displaying the information on the radio field intensity, superimposing the information on an image. FIG. 3 shows an exemplary image 50 generated in the generator 46. In an area in which radio waves from two base station devices 12 can be received, the radio field intensity of radio waves from the first base station device 12a may be displayed as a first area 80 in a gradation between certain colors, and the radio field intensity of radio waves from the second base station device 12b may be displayed as a second area 82 in a gradation between certain other colors. For example, the higher the radio field intensity, the darker the color displayed. The area in which radio waves from both base station devices 12 can be received will be indicated by a mixture of colors, which is easy for the user of the terminal device 10 to understand. When the information for guidance to a particular base station device 12 is displayed, however, only the radio field intensity of radio waves from the particular base station device 12 is displayed, as will be described later. Further, the communication enabled area 18 of the base station device 12 may be displayed in place of the radio field intensity. For example, the first communication enabled area 18a of the first base station device 12a may be displayed in the first area 80 of FIG. 3, and the second communication enabled area 18b of the second base station device 12b may be displayed in the second area 82. In this case, the two areas and the area in which the two areas overlap are displayed in different even colors. Reference is mad back to FIG. 2.

Figure 4:
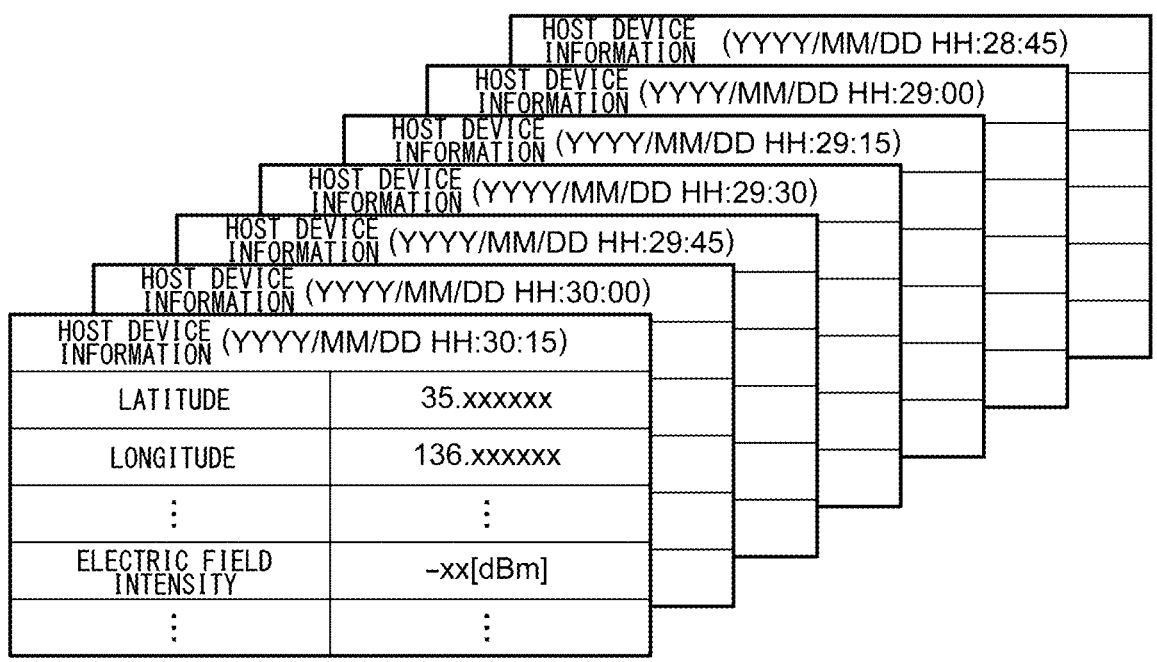
FIG. 4 shows a data structure of a database stored in the storage unit of FIG. 2.

The processor 28 outputs the data to the display unit 32, the speaker 34, and the transmitter 40 and receives an input of the data from the positioning unit 20, the microphone 24, the imaging unit 26, and the receiver 42. Of the input information, the processor 28 stores necessary information in the storage unit 30. When receiving an input of a received signal from the receiver 42, the processor 28 delivers the received signal to the RSSI measurement unit 44. The RSSI measurement unit 44 periodically measures Received Signal Strength Indicator (RSSI) based on the received signal and stores the result of measurement in the storage unit 30. FIG. 4 shows a data structure of a database stored in the storage unit 30. As shown in the figure, the position information of the host device input from the positioning unit 20 is stored in association with the time and date. The RSSI information acquired from the RSSI measurement unit 44 is also stored in association with the time and date. Specifically, the RSSI information comprises electric field intensity information. In other words, the position information (latitude, longitude) of the host device, the time and date of measuring the RSSI and the position, and the RSSI information (electric field information) are mapped to each other and stored in the storage unit 30. Information on the altitude and information on movement (moving speed, moving direction, acceleration, etc.) may additionally be stored as the position information of the host device (not shown in FIG. 4). Reference is made back to FIG. 2.

The processor 28 causes the transmitter 40 to transmit the RSSI information at the spot as well as the position information to the management device 16. The generator 46 generates display control information for displaying the guidance information received in the receiver 42, superimposing the guidance information on an image of the scenery around captured by the imaging unit 26. The details of the display control information will be described later. The display unit 32 displays the data from the processor 28. The display unit 32 displays an image in accordance with the display control information.

The controller 36 performs a process to connect to the other base station device 12 indicated in the guidance information in response to the movement of the user carrying the terminal device 10 based on the image displayed on the display unit 32. In this process, the generator 46 modifies the display control information in accordance with the situation of connection to the other base station device 12 in the controller 36. Details will be discussed below.

The features are implemented in hardware such as a CPU, a memory, or other LSI's, of any computer and in software such as a program loaded into a memory. The figure depicts functional blocks implemented by the cooperation of these elements. Therefore, it will be obvious to those skilled in the art that the functional blocks may be implemented in a variety of manners by hardware only, by software only, or by a combination of hardware and software. In this embodiment, the terminal device 10 of portable type that can be carried by the user is described as an example. The terminal device 10 may be of other types. In essence, the terminal device 10 may a device that can be moved. For example, the terminal device 10 may be a device or a computer carried on a movable body such as an automobile or a motorcycle.

Figure 5:
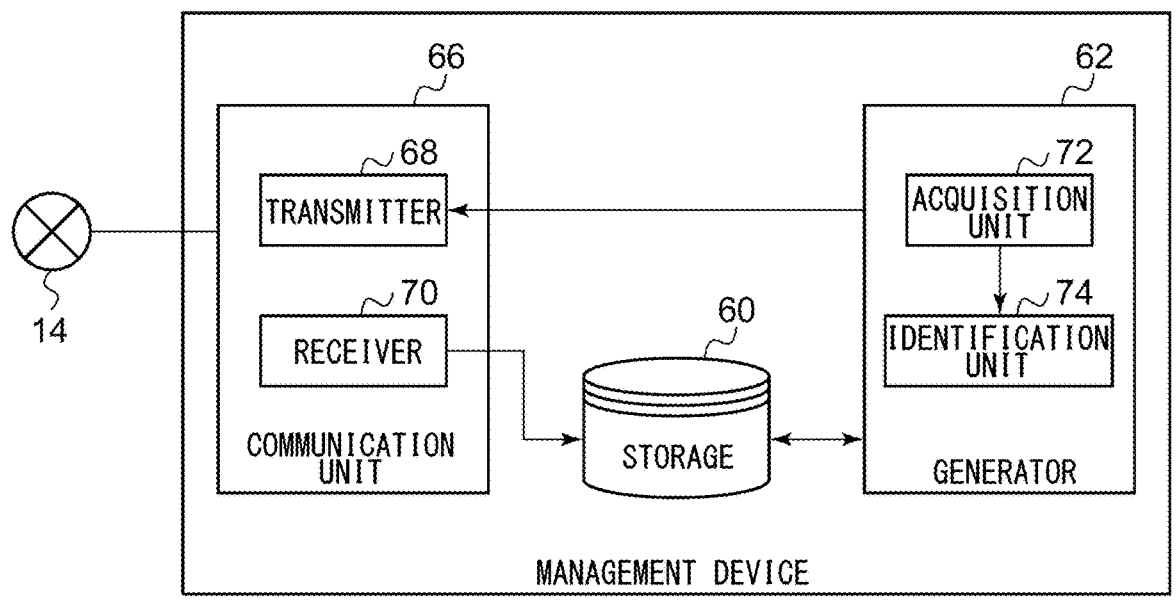
FIG. 5 shows a configuration of the management device of FIG. 1.

FIG. 5 shows a configuration of the management device 16. The management device 16 includes a storage unit 60, a generator 62, and a communication unit 66. The generator 62 includes an acquisition unit 72 and an identification unit 74. The communication unit 66 includes a transmitter 68 and a receiver 70.

The communication unit 66 connects to the base station device 12 via the network 14. The receiver 70 acquires the number of terminal devices 10 connected to each base station device 12 by receiving the number of position registrations from the base station devices 12. The receiver 70 causes the storage unit 60 to store the number of position registrations in each base station device 12. The receiver 70 also receives a combination of the position information and the RSSI information from each terminal device 10 via the base station device 12. The receiver 70 also causes the storage unit 60 to store the combination.

The storage unit 60 stores various information used for processes. FIGS. 6A-6B show a data structure of a database stored in the storage unit 60. As shown in FIG. 6*a*, the number of position registrations in each base station device 12 and a permitted value related to the number of position registrations are mapped to each other and stored in the database. The database is referred to as a terminal device registration count database. The number of position registrations is written by the receiver 70. For this reason, the number of position registrations varies in association with the movement of the terminal device 10 using the base station device 12. On the other hand, the permitted value may be entered in advance. FIG. 6B shows a database showing base station devices 12 adjacent to the respective base station devices 12. The database will be referred to as an adjacent base station device database. For example, the second base station device 12*b* and the third base station device 12*c* are adjacent to the first base station device 12*a*. FIG. 7 shows a data structure of another database stored in the storage unit 60. As shown in the figure, the terminal device IDs of the terminal devices 10 are mapped to the respective combinations of the position information and RSSI information and stored accordingly. The base station device ID of the base station device 12 connected to the terminal device 10 and the time and date of acquisition are also stored. Reference is made back to FIG. 2.

The acquisition unit 72 acquires the database stored in the storage unit 60. The identification unit 74 identifies at least one terminal device 10 that should be subject to the process by referring to the database. The identification process in the identification unit 74 will be described in detail later. Further, the identification unit 74 refers to the position information of the identified terminal device 10 registered in a given base station device 12 so as to determine the ease of connection to another base station device 12. For example, the identification unit 74 determines the ease of connection to another base station device 12 having a congestion level lower than the congestion level in said given base station device 12. This corresponds to determining another base station device 12 having a congestion level lower than the congestion level of said given base station device 12. Therefore, the identification unit 74 can be said to be a determination unit.

While the number of position registrations (i.e., the number of terminal devices 10 registered in the base station device 12) is used as an indicator indicating the congestion level in this embodiment, other indicators may be used. For example, the value derived from dividing the number of position registrations by the number of channels in the base station device 12 may be used as an indicator of the congestion level. In essence, an indicator of the congestion level may be calculated by using the number of terminal devices 10 and the resources available in the base station device 12. Alternatively, the number of calls per a unit time may be used as an indicator of the congestion level. Still alternatively, the busy count (the number of failures of call origination due to a shortage of resources in the base station device 12) per a unit time may be used as an indicator of the congestion level. Even when an indicator different from the number of position registrations is used, the permitted value corresponding to the indicator may be stored similarly as in FIG. 6A.

The generator 62 generates guidance information to prompt the terminal device 10 to move to a position where the likelihood of connection to the other base station device 12 is increased, based on a result of determination in the identification unit 74. The detail of the guidance information will be described in detail later. It can be said that guidance information is information that is transmitted from the transmitter 68 to the terminal device 10 and superimposed on an image of the scenery around captured in the terminal device 10 so as to present a display to prompt a movement to a position where the likelihood of connection to the other base station device 12 is increased.

Figure 8:
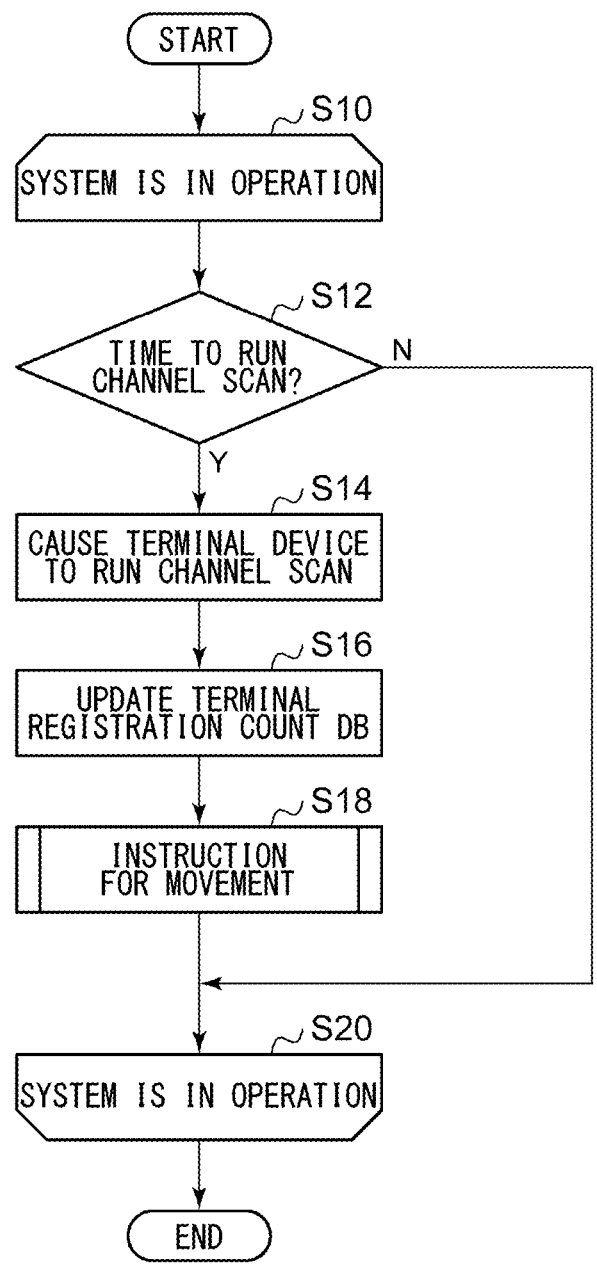
FIG. 8 is a flowchart showing a sequence of steps performed by the management device of FIG. 5.

FIG. 8 is a flowchart showing a sequence of steps performed by the management device 16. The flowchart shows steps performed by the management device 16 since it starts to monitor the usage situation in a given base station device 12 until it issues an instruction to the terminal device 10. In step S10, the management device 16 initiates a loop that is repeatedly performed while the system is in operation. In step S12, the management device 16 determines whether it is time to cause the terminal device 10 to run a channel scan. A channel scan is a process to measure the situation of each channel even while the terminal device 10 is using one of the channels to connect to the base station device 12. A channel scan identifies the presence of the base station device 12 that is in operation in each channel. A channel scan can be said to be a process whereby the terminal device 10 measures the radio field intensity of the base station device 12 from which a signal can be received and selects the base station device 12 for use.

In step S14, the management device 16 instructs the base station device 12 to transmit an instruction to cause the terminal device 10 to run a channel scan. The terminal device 10 runs a channel scan in accordance with an instruction from the management device 16 via the base station device 12. Instead of transmitting a channel scan instruction from the management device 16 to the terminal device 10, the terminal device 10 may run a channel scan at predetermined points of time or at predetermined time intervals in accordance with a timer built in the terminal device 10. Alternatively, the terminal device 10 may run a channel scan in accordance with the position information, as will be described later. Where the terminal device 10 is responsible for determining the timing of a channel scan, step S12 is omitted and the terminal device 10 will be responsible for step S14.

In step S16, the management device 16 receives the result of position registration made by the terminal device 10 in the base station device 12 selected by running a channel scan, from the base station device 12. The management device 16 updates the terminal device registration count database. In step S18, the management device 16 performs a process to instruct the terminal device 10 to move. This corresponds to performing a process of providing guidance information. In step S20, the management device 16 checks that the system is in operation and returns to step S10 to repeat the steps.

Figure 9:
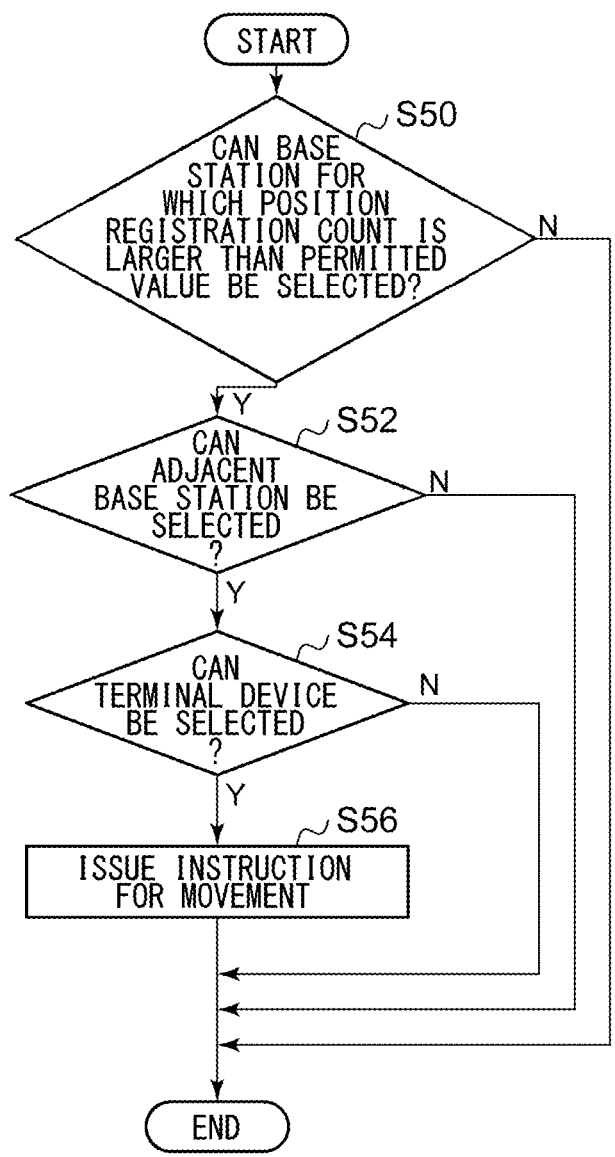
FIG. 9 is a flowchart showing a sequence of steps performed by the management device of FIG. 5 to give an instruction.

FIG. 9 is a flowchart showing a sequence of steps performed by the management device 16 to give an instruction. This is a flowchart showing the detail of step S18 of FIG. 8. In this sequence, an instruction for movement is output to terminal devices 10 that can move when the number of terminal devices 10 for which the position is registered in the base station device 12 has grown large. In step S50, the identification unit 74 determines whether it is possible to select the base station device 12 for which the number of position registrations is larger than the permitted value. When it is possible to select that base station device 12 (Y in S50), the identification unit 74 determines in step S52 whether it is possible to select the adjacent base station device 12 for which the number of position registrations is equal to or smaller than the permitted value. When it is possible to select the adjacent base station device (Y in S52), the identification unit 74 determines in step S54 whether it is possible to select the terminal device 10 subject to the process.

The following methods may be used in the determination in step S54. According to the first determination method, it is determined that selection can be made if the terminal device 10, for which the distance from the selected adjacent base station device 12 is within a predetermined range, exists. According to the second determination method, it is determined that selection can be made if the terminal device 10, for which the distance to an arbitrary position in the communication enabled area 18 of the selected adjacent base station device 12 is within a predetermined range, exists. For example, it is determined that selection can be made if the distance from the current position of the terminal device 10 to an arbitrary position in the communication enabled area 18 is within 300 m. The position of the base station device 12 and the arbitrary position in the communication enabled area 18 of the base station device 12 can be said to be a position related to the base station device 12. Therefore, the first determination method and the second determination method may be collectively referred to as a method of determining whether the distance from the position of the terminal device 10 to a position related to the selected adjacent base station device 12 is within a predetermined range.

According to the third determination method, it is determined that selection can be made if the terminal device 10, for which the estimated movement time required to move to the position of the selected adjacent base station device 12 (estimated value of the time required for movement) or the estimated time of arrival is within a predetermined range, exists. The estimated movement time may be calculated by using the moving direction and moving speed of the terminal device 10 calculated by using a history of position information of the terminal device 10.

According to the fourth determination method, it is determined that selection can be made if the terminal device 10, for which the estimated movement time required to move to an arbitrary position in the communication enabled area 18 of the selected adjacent base station device 12 or the estimated time of arrival is within a predetermined range, exists. The third determination method and the fourth determination method may be collectively referred to as a method of determining whether the estimated time required to move from the position of the terminal device 10 to a position related to the adjacent base station device 12 is within a predetermined range.

According to the fifth determination method, it is determined that selection can be made if the terminal device 10, for which the angle formed by the moving direction (motion vector) of the terminal device 10 and the direction (vector) originating at the position of the terminal device 10 and terminating at the position of the selected adjacent base station device 12 is within a predetermined range, exists. For example, it is determined that selection can be made if the the angle based on the moving direction of the terminal device 10 is smaller than 20°. Alternatively, it may be determined that selection can be made if the angle is within the predetermined range and the moving speed of the terminal device 10 is equal to or larger than a predetermined value.

According to the sixth determination method, it is determined that selection can be made if the terminal device 10, for which the angle formed by the moving direction (motion vector) of the terminal device 10 and the direction (vector) originating at the position of the terminal device 10 and terminating at an arbitrary position in the communication enabled area 18 of the selected adjacent base station device 12 is within a predetermined range, exists. For example, it is determined that selection can be made if the angle based on the moving direction of the terminal device 10 is smaller than 10°. It is desired that the arbitrary position in the communication enabled area 18 is within a predetermined distance from the current position of the terminal device 10. As in the case of the variation according to the fifth determination method, it may be determined that selection can be made if the angle used in the sixth determination method is within the predetermined range and the moving speed of the terminal device 10 is equal to or larger than a predetermined value. The fifth determination method and the sixth determination method may be collectively referred to as a method of determining whether the angle formed by the moving direction of the terminal device 10 and the direction (vector) originating at the position of the terminal device 10 and terminating at a position related to the selected adjacent base station device 12 is within a predetermined range.

The first through sixth determination method may be used in combination. For example, the first determination method and the third determination method may be combined so that it may be determined that selection can be made if the distance from the selected adjacent base station device 12 to the terminal device 10 is within a first predetermined range and the estimated time required to arrive at the position of the selected adjacent base station device 12 is within a second predetermined range. Alternatively, it may be determined that selection can be made if the distance from the selected adjacent base station device 12 to the terminal device 10 is within a first predetermined range or the estimated time required to arrive at the position of the selected adjacent base station device 12 is within a second predetermined range. If it is determined that selection can be made in step S54, it represents determining that connection between the terminal device 10 and base station device 12 is "easy". If it is determined that selection cannot be made, it represents determining that connection between the terminal device 10 and base station device 12 is "not easy (difficult)".

When the terminal device 10 can be selected (Y in S54), the management device 16 transmits guidance information, i.e., an instruction for movement, to the selected terminal device 10 (S56). Meanwhile, if it is not possible to select the base station device 12 for which the number of position registrations is larger than the permitted value (N in S50), or if it is not possible to select the adjacent base station device 12 for which the number of position registrations is equal to or smaller than the permitted value (N in S52), or if it is not possible to select the terminal device 10 (N in S54), the process is terminated.

Selection of the terminal device 10 in the identification unit 74 may be based on information other than the position information. For example, selection may be based on information on movement of the terminal device 10 (moving direction and/or moving speed). For example, of the terminal devices 10 connected to the first base station device 12a, the identification unit 74 may select the terminal device 10 approximately moving in the direction of the second base station device 12b. More specifically, given that the second base station device 12b is located to the east of the first base station device 12a, the terminal device 10 moving in a direction (orientation) between east-southeast and east-northeast may be selected, or the terminal device 10 within ±15° around the east direction may be selected. In this process, the generator 62 may present to the selected terminal device 10 the shortest route of movement to enter the second communication enabled area 18b of the second base station device 12b, as the guidance information. Alternatively, the identification unit 74 may select, of the terminal devices 10 approximately moving in the direction of the second base station device 12b, the terminal device 10 with a moving speed equal to or larger than a predetermined value.

Figure 11:
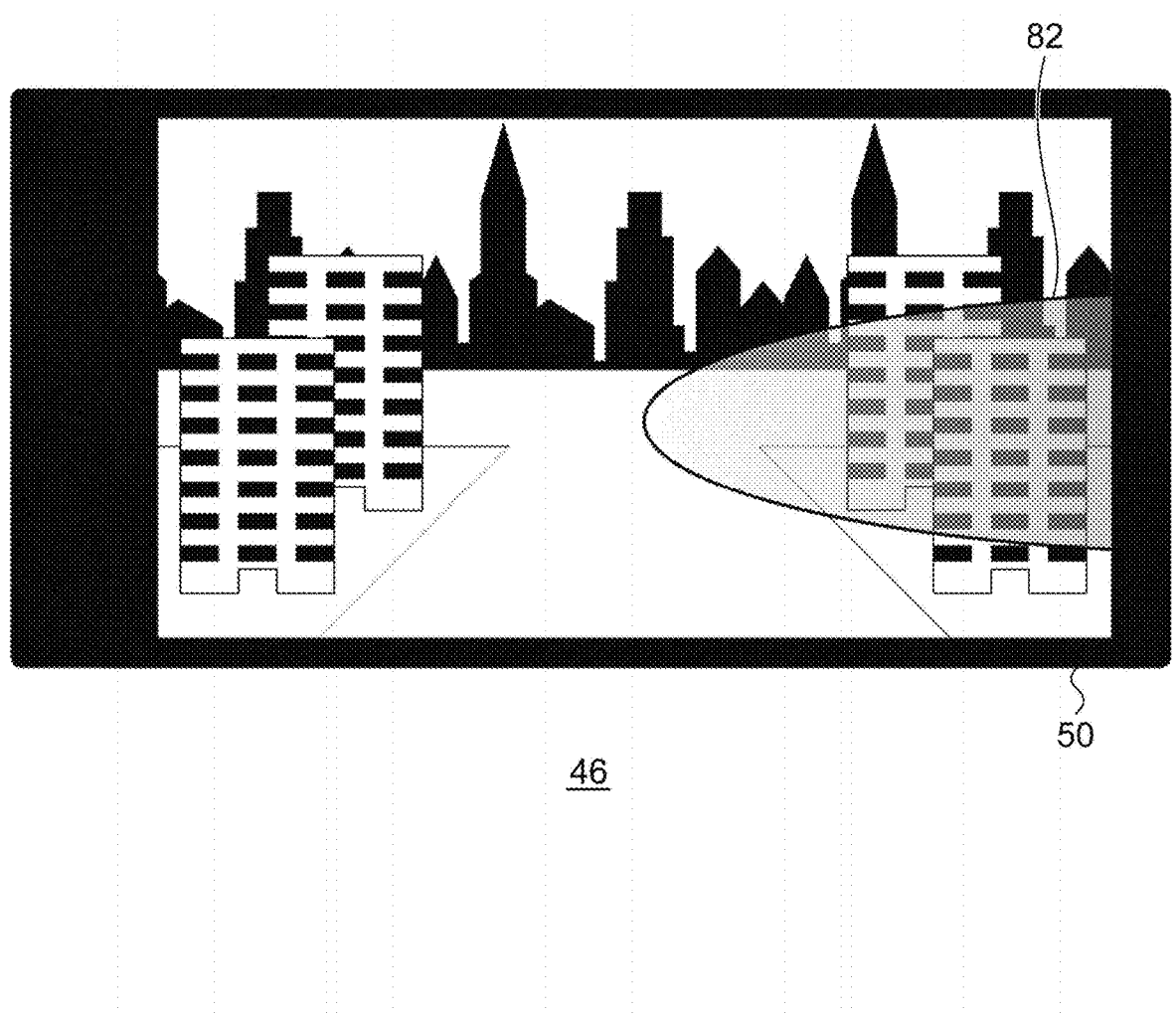
FIG. 11 shows another image 50 generated in the generator of FIG. 2.

A description will be given of the guidance information transmitted from the management device 16 to the terminal device 10 via the base station device 12. Any of the four following information may be used as the guidance information. The first guidance information is the position information (latitude, longitude) of the destination base station device 12. The position information may include altitude information. The second guidance information is area data (communication enabled area information) indicating the communication enabled area 18 of the destination base station device 12. An arbitrary shape can be used to define an area. If a circular area is used, for example, the position information (latitude, longitude) of the center and the data indicating the radius are used as area data. In this case, the storage unit 30 of the management device 16 stores the database shown in FIG. 10. FIG. 10 shows a data structure of a database stored in the storage unit 60. As shown in the figure, the position information of the position where each base station device 12 is installed and the value of the radius are entered. This allows presentation as shown in FIG. 3 or FIG. 11. FIG. 11 shows another image 50 generated in the generator 46. Referring to FIG. 11, the second area 82 that is the communication enabled area of the destination second base station device 12b is shown, but the first area 80 that is the communication enabled area of the first base station device 12a that is not the destination is not shown. The second area 82 is filled with an even color. In case a rectangular area is used, the position information (latitude, longitude) of two opposite vertices is used as area data.

Figure 12:
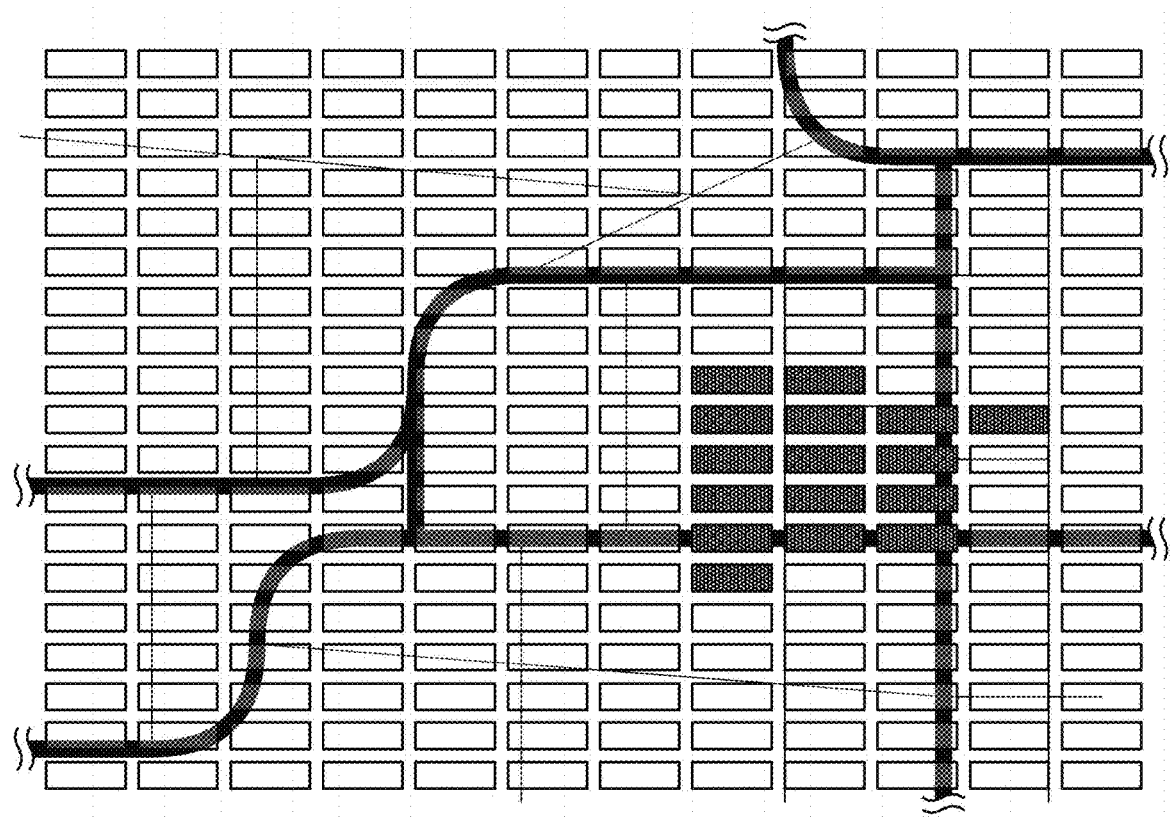
FIG. 12 shows an image displayed on a display device connected to the management device of FIG. 5.

Alternatively, a plurality of polygons (rectangles, etc.) may be combined to form area data. In this case, the coordinates of the vertices of each polygon are stored in the field for communication enabled area information in FIG. 10. The data indicating the communication enabled area 18 may be created based on the RSSI information received from each terminal device 10. Alternatively, the area data may be registered by the administrator of the management device 16. For example, information as shown in FIG. 12 may be displayed on the display device connected to the management device 16 for the purpose of registration. FIG. 12 shows an image displayed on a display device connected to the management device 16. As shown in the figure, rectangular icons are systematically arranged on a map. The administrator can configure the area data by controlling an icon. White icons (white rectangles) on the screen are outside the area, and black icons (black rectangles) are inside the area. Gray lines indicate main roads or rail routes to allow the administrator to understand the real positions corresponding to the icons intuitively. The situation of icon configuration is stored in the storage unit 30 and used as the area data.

The third guidance information is data indicating the electric field intensity at respective spots in the communication enabled area 18 of the destination base station device 12. The data indicating the electric field intensity may be data based on measurement values, or data based on simulation, or data based on both. The user can determine that proper communication is enabled by moving to a position with a high electric field intensity (e.g., position with an electric field intensity of a predetermined value or larger). By using information on the electric field intensity, the position with good communication environment can be identified more precisely than in the case of the second guidance information. The first guidance information through the third guidance information can be said to be information indicating the position (guidance position) where the likelihood of connection to the destination base station device 12 is increased. The use of the third guidance information also enables presentation as shown in FIG. 3 or FIG. 11. In this process, the display area is shaded in accordance with the electric field intensity.

The fourth guidance information is the identifier (base station ID) of the destination base station device 12. This can be used when the position information, the information on the communication enabled area 18, or the data indicating the electric field intensity of each base station device 12 is mapped to the base station ID and is stored in the storage unit 30. The identifier (base station ID) of the destination base station device 12 may be included in the first guidance information through the third guidance information.

The fifth guidance information is information related to the moving direction for moving from the position of the terminal device 10 to the position of the destination base station device 12. Alternatively, the fifth guidance information may be information related to the moving direction for moving from the position of the terminal device 10 to the communication enabled area 18 of the destination base station device 12. For example, the information may indicate "move north-northwest from the current position". Further, the information may include information on the distance of movement such as "move north-northwest from the current position by 500 m". The fifth guidance information can be said to be information indicating the direction (guidance direction) from the position of the terminal device 10 toward the position (guidance position) where the likelihood of connection to the destination base station device 12 is increased.

A description will be given of the image 50 displayed on the display unit 32 when the terminal device 10 receives the guidance information. The image 50 corresponds to the display control information in which the guidance information is reflected and is displayed to prompt the user of the terminal device 10 to move. As shown in FIG. 11, the first image 50 only shows the communication range (second area 82) of the destination base station device 12 (second base station device 12b). In this case, the radio wave reception enabled range of the base station device 12 around the terminal device 10 is shown in an image captured by the positioning unit 20 of the terminal device 10. This represents visualization of the third guidance information when it is used.

Figure 13:
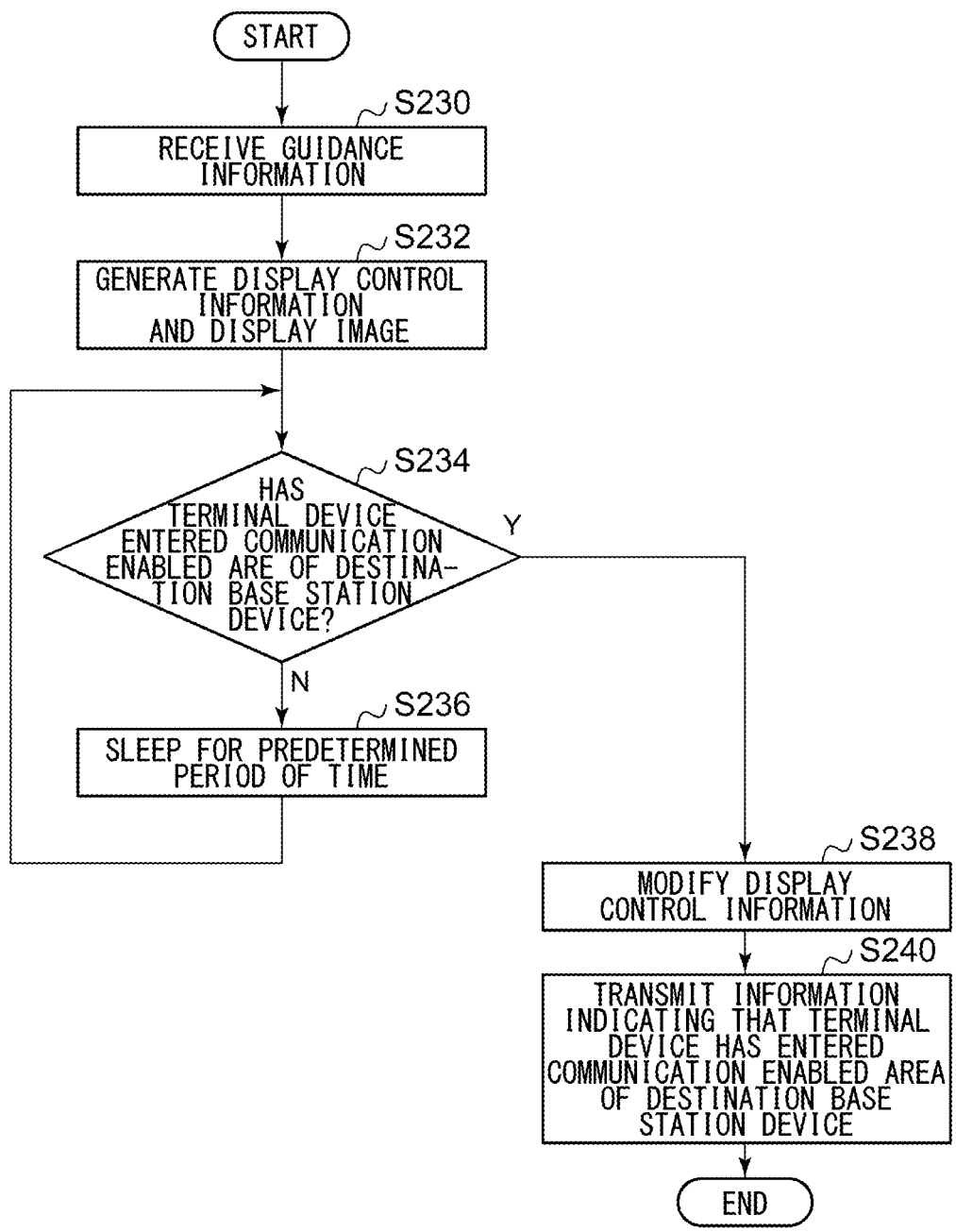
FIG. 13 is a flowchart showing a sequence of steps performed by the terminal device of FIG. 2 to communicate information.

FIG. 13 is a flowchart showing a sequence of steps performed by the terminal device 10 to communicate guidance information to the user. In step S230, the receiver 42 of the terminal device 10 receives the guidance information from the management device 16. As described above, the guidance information is for guiding the target terminal device 10 to the communication enabled area 18 of the destination base station device 12. In step S232, the generator 46 generates the display control information to cause the received guidance information to be displayed, superimposing the guidance information on an image of the scenery around captured by the imaging unit 26. The display unit 32 displays an image according to the display control information. At a point of time when the image is displayed in step S232, the terminal device 10 has not entered the communication enabled area 18 of the destination base station device 12.

In step S234, the controller 36 determines whether the host terminal device has entered the communication enabled area 18 of the destination base station device 12. When the area has not been entered yet, control proceeds to step S236, whereupon the controller 36 goes to sleep for a predetermined period of time. Control is then returned to step S234. When the communication enabled area 18 is entered, control proceeds to step S238.

In step S238, the controller 36 notifies the generator 46 that the host terminal device has arrived at the communication enabled area 18 of the destination base station device 12. Upon receiving the notification, the generator 46 modifies the display control information so as to cause the area of the base station device 12 to change its color or blink in the image 50 displayed on the display unit 32. Alternatively, the terminal device 10 may output sound or vibration. Even if the base station device 12 used by the terminal device 10 has not been changed yet, it can be said that the situation related to the connection to the destination base station device 12 (situation of connection) has been changed due to the movement to the communication enabled area 18 of the destination base station device 12. In essence, the process in step S238 represents modifying the display control information in accordance with the situation of connection to the destination base station device 12.

In step S240, the transmitter 40 transmits information indicating that the terminal device 10 has arrived at the communication enabled area 18 of the destination base station device 12 to the management device 16. After receiving this information, the management device 16 may modify the guidance information including the electric field intensity of only the destination base station device 12 and transmit, to the terminal device 10 again, the information on the electric field intensity of all base station devices 12 from which reception is possible at the position of the terminal device 10. The terminal device 10 may receive the information on the electric field intensity and display the information in place of the guidance information. Step S240 may be omitted. By presenting a display as described above, the user of the terminal device 10 is prompted to move spontaneously to the cover area displayed (area where the electric field intensity of the destination base station device 12 is high). The display can also convey to the user how far the user should move or when the user should stop moving.

Figure 14:
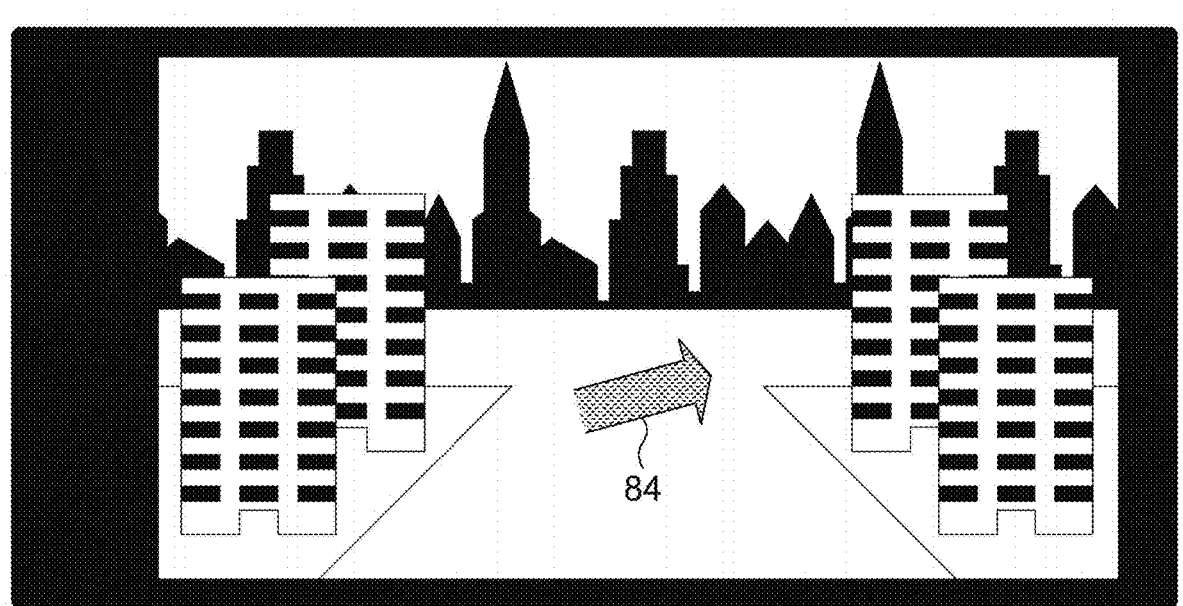
FIG. 14 shows another image generated in the generator of FIG. 2.

A description will now be given of a second image 50. FIG. 14 shows another image 50 generated in the generator 46. The generator 46 generates an arrow icon 84 indicating a direction of travel based on the position information of the destination base station device 12 included in the first guidance information and on the position information of the terminal device 10. Alternatively, the generator 46 generates the arrow icon 84 indicating a direction of travel based on the moving direction included in the fifth guidance information. Further, the generator 46 generates the image 50 by superimposing the arrow icon 84 on the image captured by the imaging unit 26. The arrow icon 84 suggests a direction in which the user carrying the terminal device 10 should travel. The display position of the arrow icon 84 can be moved desirably according to the user operation. The generator 46 causes the arrow icon 84 to disappear when the terminal device 10 enters the communication enabled area 18 of the destination base station device 12. This represents modifying the display control information in accordance with the situation of connection to the other base station device 12 in the controller 36.

The arrow icon 84 may be caused to disappear by the user's operation. When the terminal device 10 is not inside the communication enabled area 18 of the destination base station device 12 after an elapse of a predetermined period of time, the generator 46 may cause the arrow icon 84 to appear again. The generator 46 modifies the position of appearance of the arrow icon 84 depending on whether the terminal device 10 stores the map information (road information). When the map information is stored, the generator 46 locates the arrow icon 84 at an intersection or a fork in the road. When the map information is not stored, the generator 46 locates the arrow icon 84 at a position distanced from the current position by a predetermined distance (e.g., several meters) in the forward direction on the screen. The spot pointed to by the arrow icon 84 is the center of the communication enabled area 18, i.e., the spot where the antenna of the base station device 12 is installed.

Figure 15:
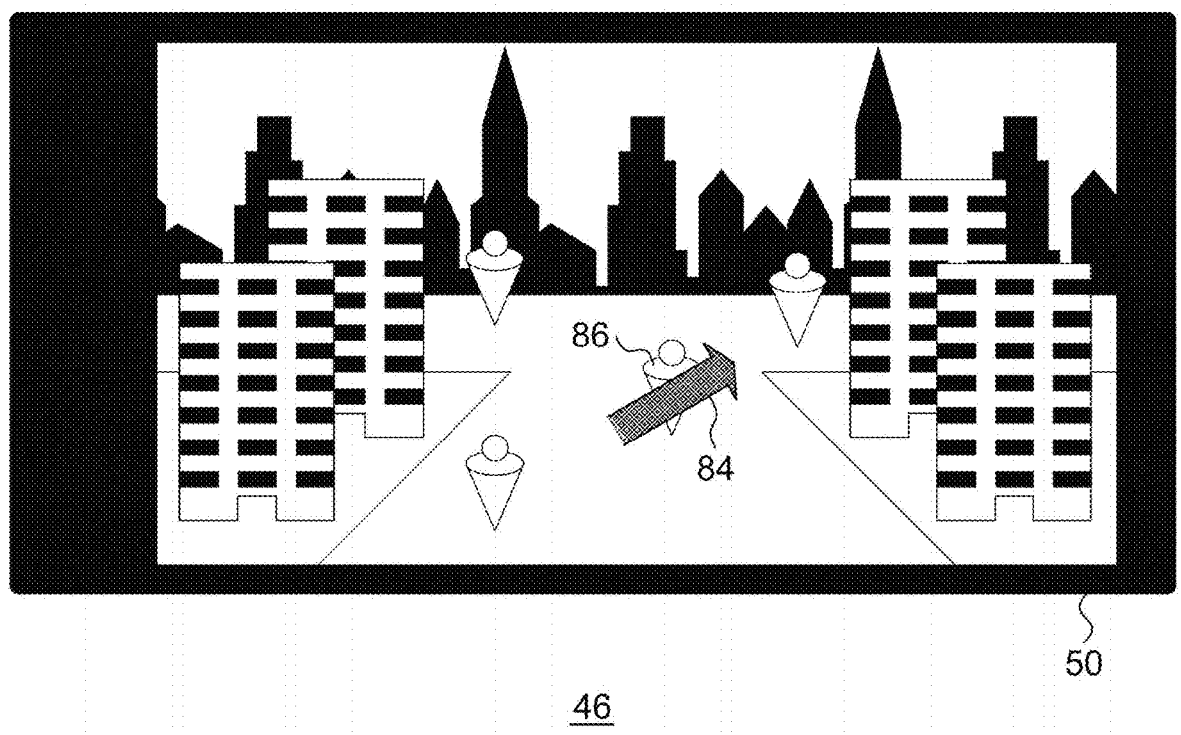
FIG. 15 shows another image generated in the generator of FIG. 2.

A description will now be given of a third image 50. FIG. 15 shows another image 50 generated in the generator 46. The generators 46 of other terminal devices 10 positioned near the terminal device 10 subject to the process (subject of movement) generate the arrow icon 84 indicating the direction of travel based on the position information of the destination base station device 12 included in the guidance information and the position information of the terminal device 10 subject to the process. The generators 46 of other terminal devices 10 receive the position information of the terminal device 10 subject to the process along with the guidance information. In this case, another party icon 86 overlapping the arrow icon 84 indicates the terminal device 10 subject to the process. The user of another terminal devices 10 checks a display like this and instructs the user of the terminal device 10 subject to the process located nearby to move. The instruction is given orally or by a wireless call. In essence, the movement is prompted by the user of another terminal device 10.

The method described here is directed to superimposing and displaying the arrow icon 84 indicating the direction in which the use should travel. Alternatively, a mark may be appended or a transparent layer may be superimposed. Still alternatively, a combination of these may be used. The spot pointed to by the arrow icon 84 is the center of the communication enabled area 18, i.e., the spot where the antenna of the base station device 12 is installed. By receiving an oral instruction from the user of the other terminal device 10 (person around), the user of the terminal device 10 subject to the process feels motivated or obliged to move more strongly than otherwise so that the likelihood of actual movement is increased. In particular, the movement is effectively prompted by transmitting the guidance information to another terminal device 10 used by a supervisor or a management person located near the user of the terminal device 10 subject to the process.

Figure 16:
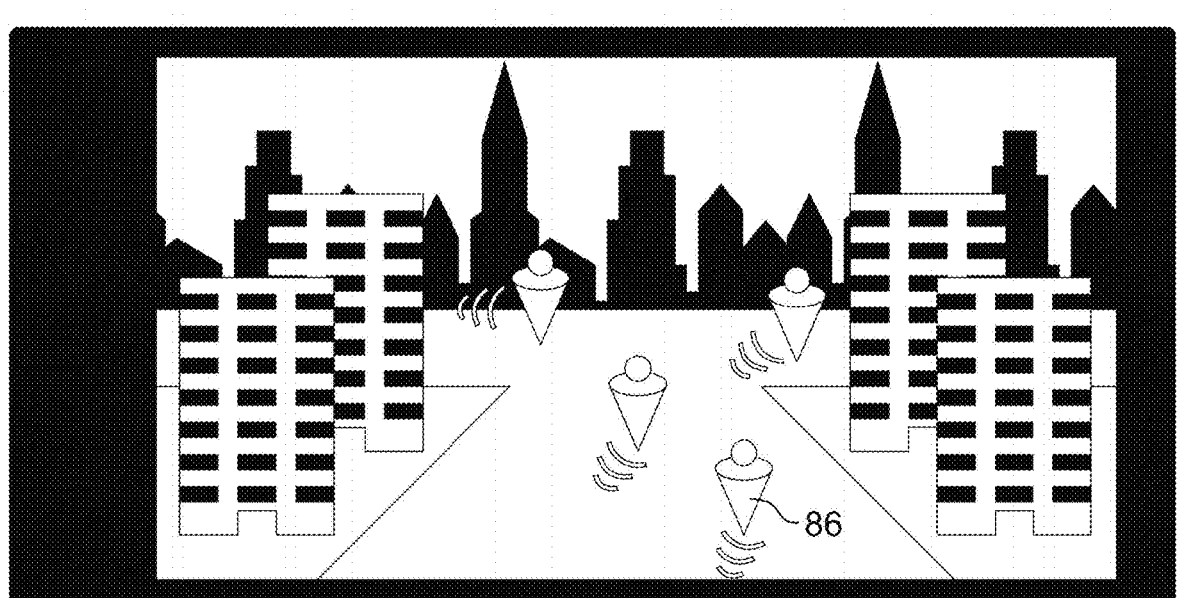
FIG. 16 shows another image generated in the generator of FIG. 2.

A description will now be given of a fourth image 50. FIG. 16 shows another image 50 generated in the generator 46. The generator 46 generates the image 50 showing the other party icon 86 indicating the user of the neighboring terminal device 10 moving in the direction of the destination base station device 12. The other party icon 86 does not show an actual user but a virtual object such as a photo, icon, etc. The icon is displayed as if the neighboring device is moving, thereby prompting the user of the terminal device 10 subject to the process to move. People tend to behave similarly as people around (crowd). The fourth image 50 is a displayed image that utilizes this characteristic of human beings and is intended to let the user of the terminal device 10 subject to the process to move spontaneously in concert with people around.

Figure 17A:
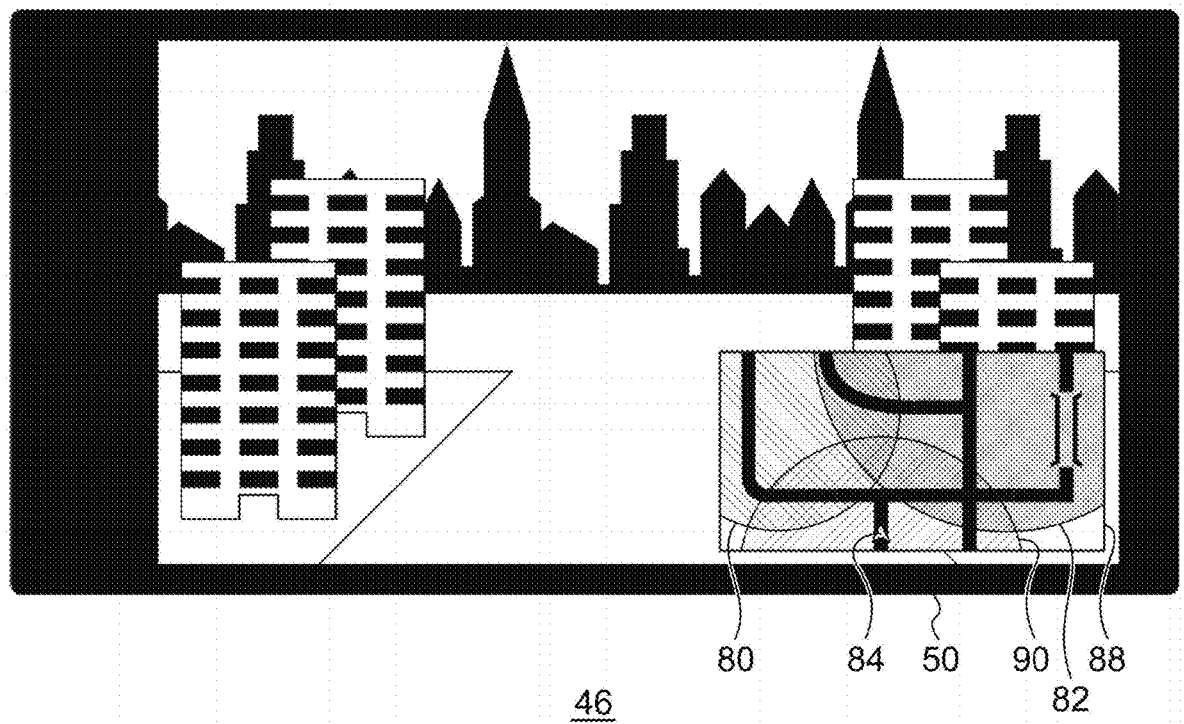
FIGS. 17A-17B show other images generated in the generator of FIG. 2.
Figure 17B:
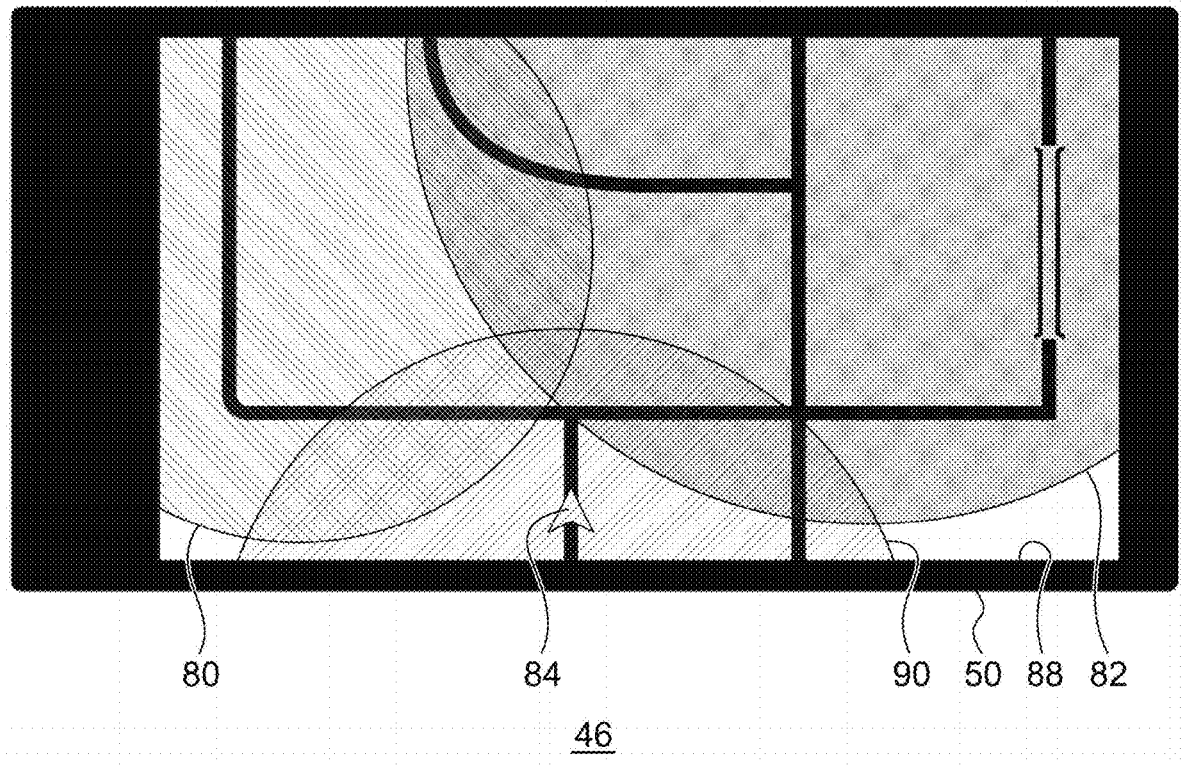

A description will now be given of a fifth image 50. FIGS. 17A-17B show other images 50 generated in the generator 46. Referring to FIG. 17A, the generator 46 displays, in a portion of the image 50, a small simplified map image 88 (two-dimensional map or three-dimensional map) showing the relative positions of the communication enabled area 18 of the base station device 12 and the user of the terminal device 10. In this process, the storage unit 30 stores the map information that covers the area around the terminal device 10. The generator 46 generates the display control information for displaying the guidance information, superimposing the guidance information on the map information stored in the storage unit 30. It can therefore be said that the guidance information is for displaying, on the map, information that prompts a movement to the position where the likelihood of connection to the other base station device 12 is increased in the terminal device 10.

As shown in FIG. 17a, the map image 88 is displayed in a portion of the image 50. The user of the terminal device 10 can modify the position and size of the map image 88 as desired. The top of the map image 88 indicates the direction of travel of the user of the terminal device 10, and the arrow icon 84 indicates the user's position. The first area 80, the second area 82, and a third area 90, which are circular areas, indicate the first communication enabled area 18a through the third communication enabled area 18c, respectively. Alternatively, the direction of travel of the user may be indicated by the direction of the arrow icon 84. By modifying the display by, for example, causing the destination communication enabled area 18 to blink or changes its color, the user of the terminal device 10 is guided to the destination.

Alternatively, the generator 46 may display the closest position, the shortest route, the route with the shortest movement time, the route in which the radio wave environment is considered (route in which a movement can be made without interruption in communication), the route of movement in which the traffic congestion is considered, etc., required for registration of the terminal device 10 subject to the process in the destination base station device 12 Alternatively, as shown in FIG. 17B, the generator 46 may display only the map image 88, which is a two-dimensional map or a three-dimensional map. For example, the generator 46 may display, on the map image 88, the arrow icon 84 indicating the current position of the terminal device 10, and the first area 80, the second area 82, and the third area 90, which are destination communication enabled areas 18, so as to prompt a movement. The shortest route from the current position to the destination, the route with the shortest movement time, the route in which the radio wave environment is considered (route in which a movement can be made without interruption in communication), the route of movement in which the traffic congestion is considered, etc. may be displayed. Where AR display is not performed as in this case, the imaging unit 26 of the terminal device 10 may be omitted.

Figure 18:
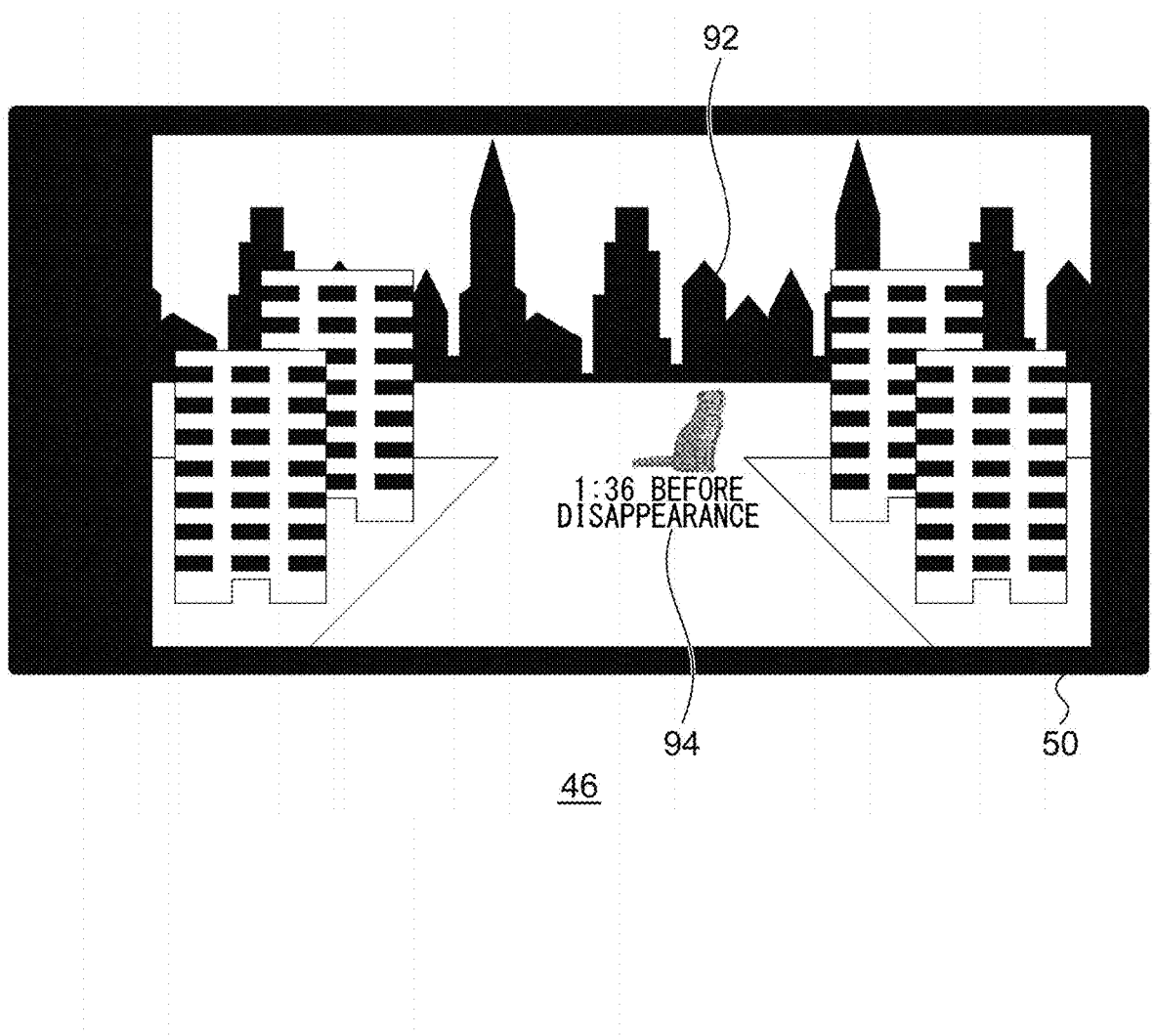
FIG. 18 shows another image generated in the generator of FIG. 2.

A description will now be given of a sixth image 50. FIG. 18 shows another image 50 generated in the generator 46. The display control information generated in the generator 46 displays the guidance information by using a virtual character 92. It can be said that the guidance information is displayed in the terminal device 10 by using the virtual character 92. The virtual character 92 is located in a direction in which the movement should be made or in a route in which the movement should be made. As shown in the figure, the virtual character 92 that is attractive is displayed on the display unit 32 of the terminal device 10 subject to the process. The spot where the virtual character 92 is located is the point that the user of the terminal device 10 should move to.

When the distance between the position of the terminal device 10 and the position of appearance of the virtual character 92 is within a predetermined value, the data for the virtual character 92 can be saved in the terminal device 10. This process is completed when the terminal device 10 has moved to the spot where the virtual character is located. In essence, the processor 28 of the terminal device 10 is provided with a calculation unit for calculating a score of matching between the guidance information and the position information of the terminal device 10. The generator 46 modifies the display control information in accordance with the matching score calculated in the calculation unit. In other words, the display state of the virtual character 92 is changed in accordance with the matching score. A plurality of types of virtual characters 92 may be available and the appearance ratio thereof may vary between characters. There are many users who feel attracted to collecting a plurality of virtual characters 92. Therefore, the terminal device 10 can be moved efficiently by locating a plurality of virtual characters 92 at important positions/points on the guidance route.

Further, the generator 46 may delete the virtual character 92 from the image 50 after an elapse of a predetermined period of time so that the processor 28 cannot save the data even if the user moves to the spot where the virtual character 92 was located after the disappearance. The generator 46 is adapted to display a message 94 indicating the time before disappearance near the virtual character 92. By setting the time before disappearance appropriately, the user is prompted to move quickly, facilitating more efficient movement of the terminal device 10.

In return for the passing of the terminal device 10 by the position of appearance of the virtual character 92 (predetermined position related to the route of movement), the management device 16 may reward the terminal device 10 with a point or a coupon. More specifically, the calculation unit of the management device 16 calculates a score of matching between the guidance information and the position information of the terminal device 10. A point management unit changes the point associated with the terminal device 10 when the matching score calculated in the calculation unit meets a predetermined condition. Information indicating the number of points acquired depending on the position that the user of the terminal device 10 passes by, etc. may be displayed in the sixth image 50 shown in FIG. 18 or in the other images 50. For example, information indicating that 50 points can be acquired by passing by the position of appearance of the virtual character 92 may be displayed. The user moves in the direction indicated in the terminal device 10 in an aim to increase (accrue) the point. The user may receive a service from the communication system 100 or other products or services when a predetermined amount of points have been collected. For example, the benefit of 60 minutes of toll-free calls in the terminal device may be offered, or the benefit related to the speed or capacity of data communication may be offered when 1000 points have been collected.

After the image 50 based on the guidance information as described above is displayed, the controller 36 of the terminal device 10 performs a process of changing the base station device 12 for use depending on the current position. In this embodiment, the following channel scan process is performed in the step of changing the base station device 12 for use.

In the first channel scan process, it is detected that the position of the terminal device 10 enters the communication enabled area 18 of the destination base station device 12, and the controller 36 performs a channel scan process at that point of time. In this case, the controller 36 uses the second guidance information or the third guidance information. Alternatively, information on the communication enabled area 18 of the terminal device 10 may be stored in the storage unit 30 and the controller 36 may use the fourth guidance information. The first channel scan process is performed before or after step S238 when a determination of (Y) is made in step S234 of FIG. 13. Alternatively, the first channel scan process may be performed in one sitting in step S238.

In the second channel scan process, it is detected that the position of the terminal device 10 is within a predetermined distance from the position of the destination base station device 12, and the controller 36 performs a channel scan periodically under that condition. In this case, the controller 36 uses the first guidance information in combination.

In the third channel scan process, the time that a channel scan should be performed is estimated from the position and moving speed of the terminal device 10, and the controller 36 performs a channel scan at that point of time. For example, the controller 36 estimates the point of time that the terminal device 10 enters the communication enabled area 18 of the destination base station device 12 from the current position and moving speed. When the storage unit 30 does not store map information (information on road map), the controller 36 calculates the time required for movement, assuming that the movement is made linearly along the extension of the current moving direction. When the storage unit 30 stores map information, the controller 36 calculates the distance of the shortest route and estimates the time of arrival. If a connection to a target channel cannot be made as a result of the channel scan, the controller 36 acquires the position information of the terminal device 10 and re-calculates the distance to the destination and the time of arrival. The third channel scan process is suitable for a case where the period of acquiring position information by the terminal device 10 is long (the terminal device 10 cannot acquire position information frequently).

In the fourth channel scan process, the controller 36 reduces the period of channel scans if it is detected that the terminal device 10 is moving in the direction of the destination base station device 12. This is suitable for a case where the controller 36 performs a channel scan periodically. For example, it is assumed that the controller 36 performs a channel scan once in every five minutes in a normal mode. In this case, when the controller 36 detects that the terminal device 10 is moving in the direction of the destination base station device 12, the controller 36 reduces the period of channel scans and performs a channel scan once in one minute. This scheme can also be used when the position information (latitude, longitude) of the terminal device 10 cannot be acquired using a GPS, etc. For example, an acceleration sensor and an electronic compass may be built in the terminal device 10 so as to detect the moving direction and moving speed.

In a channel scan process, the condition to connect to the destination base station device 12 may be different from the condition to connect to the other base station devices 12 (including the source base station device 12). For example, of the base station devices for which a received electric field intensity is of a first predetermined value or higher, the base station device 12 with the highest received electric field intensity is selected in a channel scan process in a normal mode. When the guidance information is presented, however, the destination base station device 12 may be selected in preference to the other base station devices even if the electric field intensity is smaller than those of the other base station devices 12, provided that the electric field intensity of the destination base station device 12 is of a value equal to or larger than the first predetermined value. Further, in a channel scan process in a normal mode, the condition may require that the electric field intensity of the selected base station device 12 is of a value equal to or larger than the first predetermined value. When the guidance information is presented, the condition may require that the electric field intensity of the destination base station device 12 is of a value equal to or larger than a second predetermined value smaller than the first predetermined value. Alternatively, a method different from the first-fourth channel scan processes may be used. For example, a message prompting a channel scan operation may be shown in the image 50 in step S238 so as to prompt the user using the terminal device 10 to perform a channel scan process manually.

As described above, the generator 46 may modify the display to let the user know that a channel scan is proceeding while a channel scan for connecting to the destination base station device 12 is proceeding by, for example, causing the image 50 displayed on the display unit 32 to blink. Alternatively, the generator 46 may present a display after a channel scan to let the user know that a connection is made to the destination base station device 12. For example, the generator 46 may change the display color or display pattern of the second area 82 in FIG. 11 before and after a connection is made to the destination base station device 12. Changing the display like this represents changing the display control information depending on the situation of connection to the destination base station device 12. The image 50 during and after a channel scan may be identical to or different from the image 50 displayed when the communication enabled area 18 is entered (image 50 in step S238). For example, the second area 82 of FIG. 11 may be indicated by a reddish shaded image when the terminal device 10 is located outside the communication enabled area 18 of the destination base station device 12 (step S232), the second area 82 may be indicated by a yellowish shaded image when the communication enabled area 18 is entered (step S238), the second area 82 may be indicated by a greenish shaded image during a channel scan, and the second area 82 may be indicated by a bluish shaded image when the base station device 12 for use is switched to the second base station device 12b. Such a process represents modifying the display control information depending on the likelihood of connection to the base station device 12 and also can be said to represent modifying the display control information depending on the status of connection process in the controller 36.

According to this embodiment, the guidance information suggesting the movement of the terminal device that will increase the ease of connection to another base station device determined on the basis of the position information of the terminal devices registered in a given base station is generated. Therefore, the terminal device is guided to a proper position in consideration of the ease of connection in the communication system. Since the ease of connection to another base station device having a congestion level lower than the congestion level in said given base station device 12 is determined, the terminal device can be guided so that the congestion levels in the base station devices are substantially equal. Since the guidance information is transmitted to the terminal device, the terminal device can be moved to a position where the likelihood of improving the efficiency of operation in the communication system, ease of communication (connection), and communication quality is high.

The guidance information is information to prompt the terminal device to move to a position where the likelihood of connection to the other base station device 12 is increased, and the terminal device displays an image in which an image of the scenery around captured in the terminal device and the guidance information are superimposed on the display unit. Accordingly, the user know the position to which a movement should be made and the direction in which a movement should be made in a manner easy to understand. The guidance information is information to prompt the terminal device to move to a position where the likelihood of connection to the other base station device is increased, and the terminal device displays a map reflecting the guidance information on the display unit. Accordingly, the user know the position to which a movement should be made and the direction in which a movement should be made in a manner easy to understand. Using a virtual character to display the guidance information makes it easier to prompt the user of the terminal device to make a movement. Since the point associated with the terminal device is changed in accordance with the score of matching between the guidance information and the position information of the terminal device, the user of the terminal device is prompted to make a movement.

By displaying the guidance information, superimposing it on an image showing the scenery around, the user can move easily. The user of the terminal device can check the communication enabled area of the base station device to which the user should move by viewing an augmented reality image. Changing the display control information depending on the situation of connection to another base station device makes it possible to let the user know the situation of connection. By displaying the guidance information superimposed on map information, the movement is facilitated. By guiding the movement by displaying a virtual character, the load experienced by the user in making a movement is reduced. By staging a movement that users tend to feel bothering as entertainment, a large number of users can be prompted to move spontaneously and actively. By sharing the guidance information with other terminal devices, users not aware of an instruction from the management device or users who fail to check an instruction can be navigated by other users.

Embodiment 2

A description will now be given of embodiment 2. Like embodiment 1, embodiment 2 relates to a communication system including a plurality of terminal devices configured to communicate with each other via a base station device. In embodiment 2, terminal devices perform group calls. Group call is a function provided in, for example, business wireless devices. In a group call, a plurality terminal devices configured to use the same channel and same group number communicate using one channel. If the terminal devices included in the same group are gathered in the area of one base station device, the communication system as a whole can be operated with a reduced number of channels used. While it is desired in a group call to arrange terminal devices such that the number of channels used is as small as possible. However, it would not be easy to provide such an instruction or guidance to terminal devices with the result that efficient operation of radio waves has not always been easy to perform. The communication system 100, the terminal device 10, and the management device 16 according to embodiment 2 are of the same type as those of FIGS. 1, 2, and 5. The following description concerns a difference.

The receiver 70 of FIG. 5 receives, from each base station device 12, the number of position registrations of the terminal devices 10 in each group. The receiver 70 stores the number of registrations in each group in the storage unit 60. The storage unit 60 stores a database described below. FIG. 19 shows a data structure of the database stored in the storage unit 60. The database shows the group numbers, the numbers of position registrations in each group, and the lower limit values in each base station device 12. The database is also referred to as terminal device registration count database. The group numbers are assigned to identify the groups. The number of position registrations in each group is mapped to the group number. The terminal devices 10 to which the same group number is assigned belong to the same group and so can perform a group call even if they are connected to different base station devices 12.

For example, the terminal devices 10 of group number "1" connected to the first base station device 12a and the group with group number "1" connected to the third base station device 12c may be referred to as "group 1". The same holds true of the groups with the other group numbers. The group numbers and the number of position registrations in the respective groups are written by the receiver 70. The lower limit value is a threshold value referred to for transmission of the guidance information to the terminal device 10 and is a value arbitrarily set by the manager, etc. of the communication system 100. The management device 16 identifies a group for which the number of position registrations in the base station device 12 is smaller the lower limit value and transmits guidance information for guidance to another base station device 12 to all terminal devices 10 in the group for which the position is registered in that base station device 12. In this process, the terminal device 10 is guided to the base station device 12 in which a large number of terminal devices in that group are registered. The process enables reduction in the resources of the communication system 100 as a whole. Reference is made back to FIG. 5.

The identification unit 74 selects, from the groups registered in a given base station device 12, one or more groups as a subject of the process. The selection process in the identification unit 74 will be described later. The identification unit 74 can be said to be a selection unit, too. The generator 62 generates guidance information indicating for presenting information that prompts at least some of the terminal devices 10 belonging to the group selected in the identification unit 74 to make a movement that will increase the likelihood of connection to another base station device 12.

In step S16 of FIG. 8, the management device 16 retrieves the base station device ID, the terminal device ID, and the group number included in the received information. The management device 16 stores, in the storage unit 60, registration situation data indicating base station devices 12 and terminal devices 10 registered in the respective base station devices 12. FIG. 20 shows a database of another database registered in the storage unit 60. The database corresponds to the registration situation data and is comprised of a combination of base station device IDs, group numbers, and terminal device IDs. If, as a result of checking newly received information against the registration situation data, the terminal device 10 included in the new information is not found in the registration situation data (in the case of new registration), the management device 16 increases the number of position registrations corresponding to the relevant base station device 12 and the group number in the terminal device registration count database of FIG. 19 by 1. Further, the management device 16 adds data related to that terminal device 10 in the registration situation data. When the terminal device 10 is found in the registration situation data, the management device 16 determines whether the base station device 12 or the group number has changed. When the base station device 12 or the group number has changed, the management device 16 decrements the number of registrations for the base station device 12 immediately previously used and the immediately previous group number by one, and increments the number of position registrations corresponding to the base station device 12 newly used and the new group number by one. Further, the management device 16 updates the terminal device registration count database.

Figure 21:
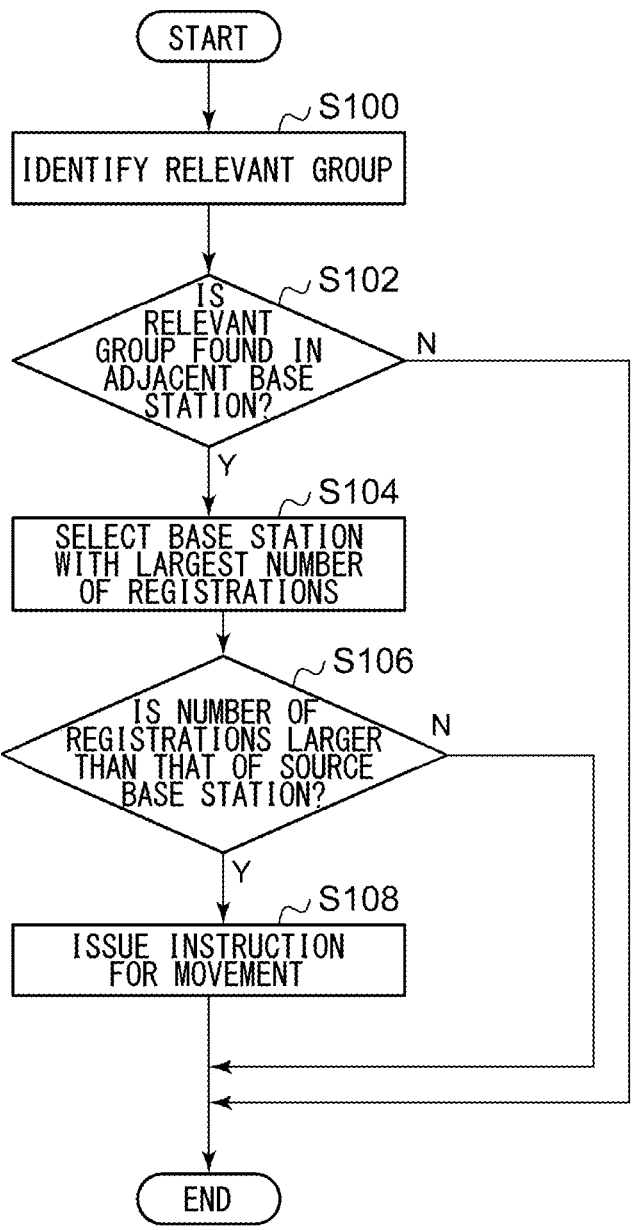
FIG. 21 is a flowchart showing a first sequence of steps performed by the management device according to embodiment 2 to give an instruction.

A description will now be given of a process to transmit guidance information (hereinafter, referred to as "sequence of steps to give an instruction) in embodiment 2. First, the first sequence of steps to give an instruction will be described. FIG. 21 is a flowchart showing first sequence of steps performed by the management device 16 to give an instruction. In step S100, the identification unit 74 identifies, of all groups registered in a given base station device 12, a group for which the number of position registrations is smaller than the lower limit number (hereinafter, referred to as "relevant group"). The lower limit value corresponds to the threshold value. In step S102, the identification unit 74 determines whether the relevant group is registered in the adjacent base station device 12. The determination on the adjacent base station device 12 is made by referring to the adjacent base station device database mentioned above. When the relevant group is registered, control proceeds to step S104. When the relevant group is not registered, the process is terminated.

In step S104, the identification unit 74 selects the destination base station device 12. When there are a plurality of adjacent base station devices 12, the identification unit 74 selects the base station device 12 in which the largest number of terminal devices in the relevant group are registered. When there is one adjacent base station device 12, the identification unit 74 determines the destination base station device 12, bypassing the selection process.

In step S106, the identification unit 74 determines whether the number of registrations in the group made in the destination base station device 12 is larger (Y) than the number of registrations in the relevant group made in the source base station device 12 or not (N). When the number is larger, control proceeds to step S108. When the number is not larger, the process is terminated. In this process, even if the number of terminals registered in the destination base station device 12 is below the lower limit value, the destination base station device 12 is subject to the process provided that the number is larger than that registered in the source base station device 12. Thus, the identification unit 74 selects a group for which the number of terminal devices registered in the destination base station device 12 and belonging to the group is larger than the number of terminal devices registered in the source base station device 12 and belonging to the group. In step S108, the management device 16 instructs the terminal devices 10 of the relevant group registered in the source base station device 12 to move. More specifically, the transmitter 68 transmits the guidance information for guidance to the destination base station device 12 to the terminal devices 10.

A description will now be given of a second sequence of steps to give an instruction. In the first sequence of steps to give an instruction, the terminal device 10 is directed to make a movement by using a condition that requires the number of position registrations of the terminal devices 10 be smaller than the lower limit value. In the second sequence of steps to give an instruction, an instruction for movement is given on the condition that the number of groups registered in the base station device 12 is equal to or larger than a predetermined number. In the following description, it is assumed that the terminal device registration count database shown in FIG. 22 is stored in the storage unit 60 of the management device 16. It is assumed that the situation of adjacent base station devices 12 is as defined in the adjacent base station device database mentioned above. In the example shown in FIG. 22, the number of groups belonging to the first base station device 12a is "7", and a condition that requires that the number of groups registered in the base station device 12 be equal to greater than a predefined value (predetermined value) of "5" is used as the condition to give an instruction for movement.

Figure 23:
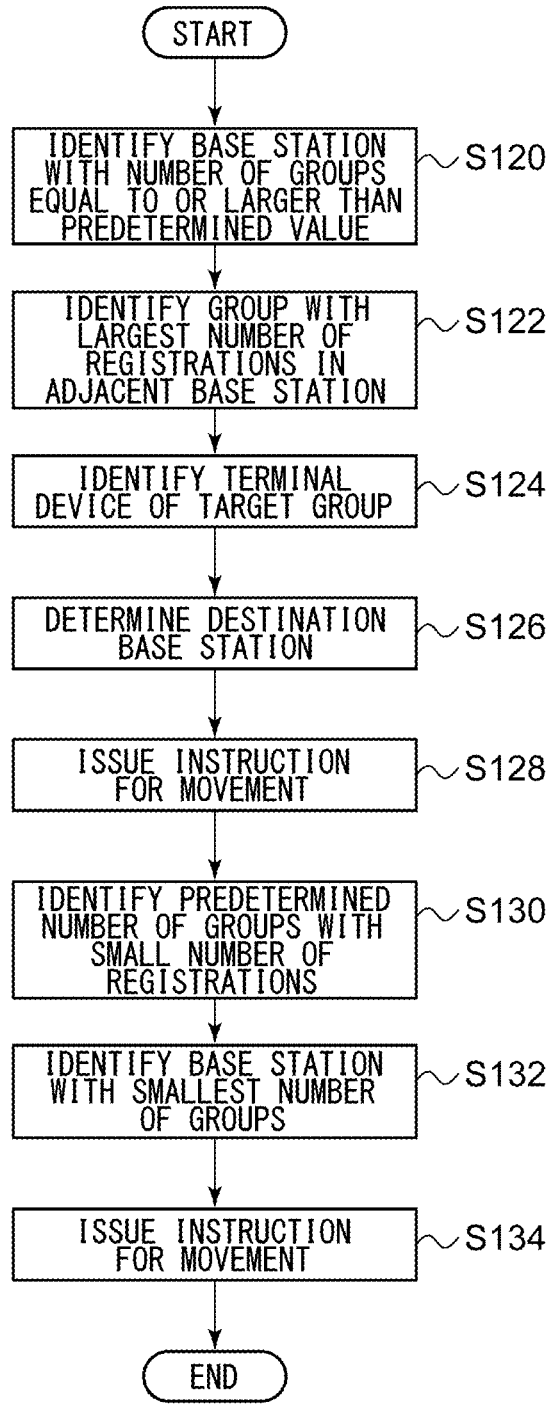
FIG. 23 is a flowchart showing a second sequence of steps performed by the management device according to embodiment 2 to give an instruction.

FIG. 23 is a flowchart showing a second sequence of steps performed by the management device 16. In step S120, the identification unit 74 checks whether the number of groups registered in the base station device 12 is equal to or larger than a predetermined number and identifies the base station device 12 that meets the requirement. The terminal device registration count database of FIG. 22 shows that 7 groups, which is greater than the predetermined value (5), are registered in the first base station device 12*a*. Therefore, the identification unit 74 identifies the first base station device 12*a* as the subject of the process. Alternatively, the identification unit 74 may identify, of the plurality of base station devices 12 forming the communication system 100, a predetermined number of base station devices 12 arranged in the descending order of the number of groups registered in the base station device 12. In this process, the predetermined number may be defined to be 1 so that the base station device 12 with the largest number of groups registered may be identified as the subject of the process. Still alternatively, the subject of the process may be identified by referring to the congestion levels of the respective base station devices 12. For example, the base station device 12 for which the indicator indicating the congestion level is equal to larger than a predetermined value, or a predetermined number of base station devices 12 arranged in the descending order of the magnitude of the indicator indicating the congestion level may be identified as the subject of the process. Any of a variety of indicators described above may be used as the indicator indicating the congestion level.

In step S122, the identification unit 74 identifies, of group 1~group 7 registered in the first base station device 12*a* thus identified, a predetermined number of groups arranged in the descending order of the number of position registrations in each of the adjacent base station devices 12. For example, assuming that the predetermined number is defined to be "1", the identification unit 74 identifies a group with the largest number of position registrations in each of the first second base station device 12*b* and the third base station device 12*c*. In this process, the adjacent base station device database is used. In the example shown in FIG. 22, the number of position registrations (30) in group 2 is the largest in the second base station device 12*b*. In the third base station device 12*c*, the number of position registrations (30) in group 3 is the largest. Therefore, the identification unit 74 identifies group 2 and group 3. Instead of identifying a predetermined number of groups in the descending order of the number of position registrations, groups, for which the number of position registrations is equal to or larger than a predetermined number (e.g., "20") in the adjacent base station device 12 may be identified.

In step S124, the identification unit 74 identifies the terminal devices 10 registered in the base station device 12 identified in step S120 and belonging to the group identified in step S122 as the terminal devices 10 subject to the process. In the case of the example shown in FIG. 22, the terminal devices 10 of group 2 and group 3 registered in the first base station device 12*a* are subject to the process. In step S126, the identification unit 74 identifies the destination base station device 12. In the case of the example shown in FIG. 22, the destination of the terminal devices 10 in group 2 is the second base station device 12*b* and the destination of the terminal devices 10 in group 3 is the third base station device 12*c*. In step S128, the transmitter 68 transmits the guidance information prompting a movement to the base station device 12 identified in step S126 to the terminal device 10 identified in step S124 via the base station device 12.

In step S130, the identification unit 74 identifies, in the base station device 12 identified in step S120 (first base station device 12*a*), a predetermined number of groups arranged in the ascending order of the number of position registrations as further subjects of the process. In the example shown in FIG. 22, assuming that the predetermined number is 2, group 6 and group 7, which are two groups with the smallest number of position registrations in the first base station device 12*a*, are subject to the process. In step S132, the identification unit 74 uses the adjacent base station device database and identifies, of the second base station device 12*b* and the third base station device 12*c* adjacent to the first base station device 12*a* identified, the base station device 12 with the smallest number of groups as the destination. In the example shown in FIG. 22, the third base station device 12*c* is identified as the destination. In step S134, the transmitter 68 transmits the guidance information prompting a movement to the base station device 12 identified in step S132 to the terminal device 10 belonging to the group identified in step S130 and registered in the first base station device 12*a* via the baes station device 12.

A description will now be given of a third sequence of steps to give an instruction. In the scheme hitherto described, the guidance information is transmitted to all terminal devices 10 registered in the identified base station device 12 and belonging to a particular group. In the third sequence of steps to give an instruction, the guidance information is transmitted to some of the terminal devices 10 registered in the identified base station device 12 and belonging to a particular group.

Figure 24:
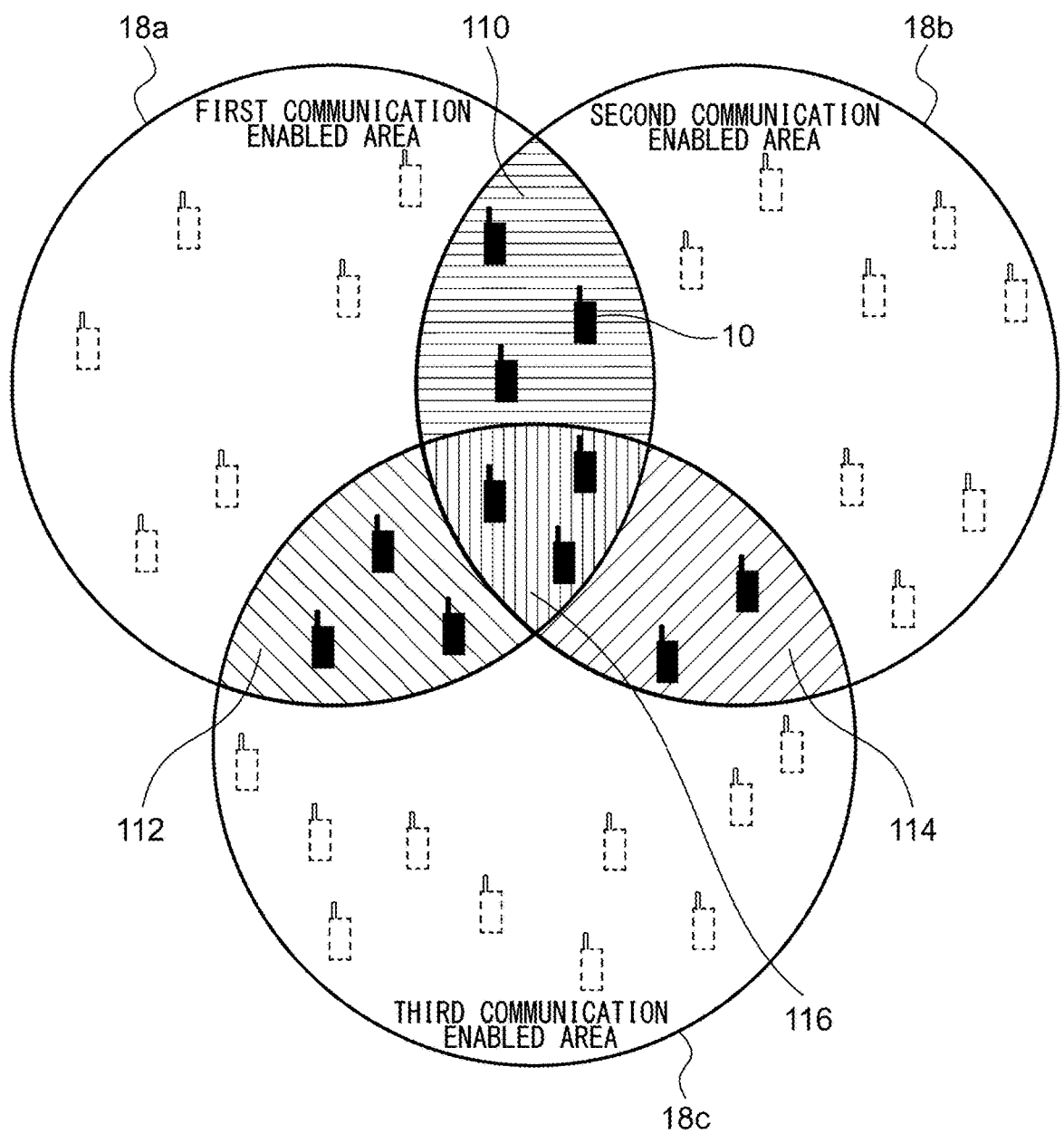
FIG. 24 shows a configuration of the communication system according to embodiment 2.

FIG. 24 shows a configuration of the communication system 100. In this configuration, the terminal device 10 can use a plurality of base station devices 12. Referring to the figure, area A110 through area D116 are located. In the communication enabled areas 18 indicated by shading, two or more base station devices 12 are available. Area A110 is an area in which the first communication enabled area 18*a* and the second communication enabled area 18*b* overlap, and area B112 is an area in which the first communication enabled area 18*a* and the third communication enabled area 18*c* overlap. Area C114 is an area in which the second communication enabled area 18*b* and the third communication enabled area 18*c* overlap, and area D116 is an area in which the first communication enabled area 18*a* through the third communication enabled area 18*c* overlap. Terminal devices 10 are also located in places where the communication enabled areas 18 do not overlap. It will be assumed that the position information of the terminal devices 10 is transmitted successively from the terminal devices 10 to the management device 16 and the management device 16 has the knowledge of the positions of the terminal devices 10.

FIG. 25 shows another example of data in the terminal device registration count stored in the storage unit 60. In this case, no groups are identified for which the number of position registrations is below the lower limit value. The guidance information may be transmitted to a selected terminal device 10 even in such a case.

Figure 26:
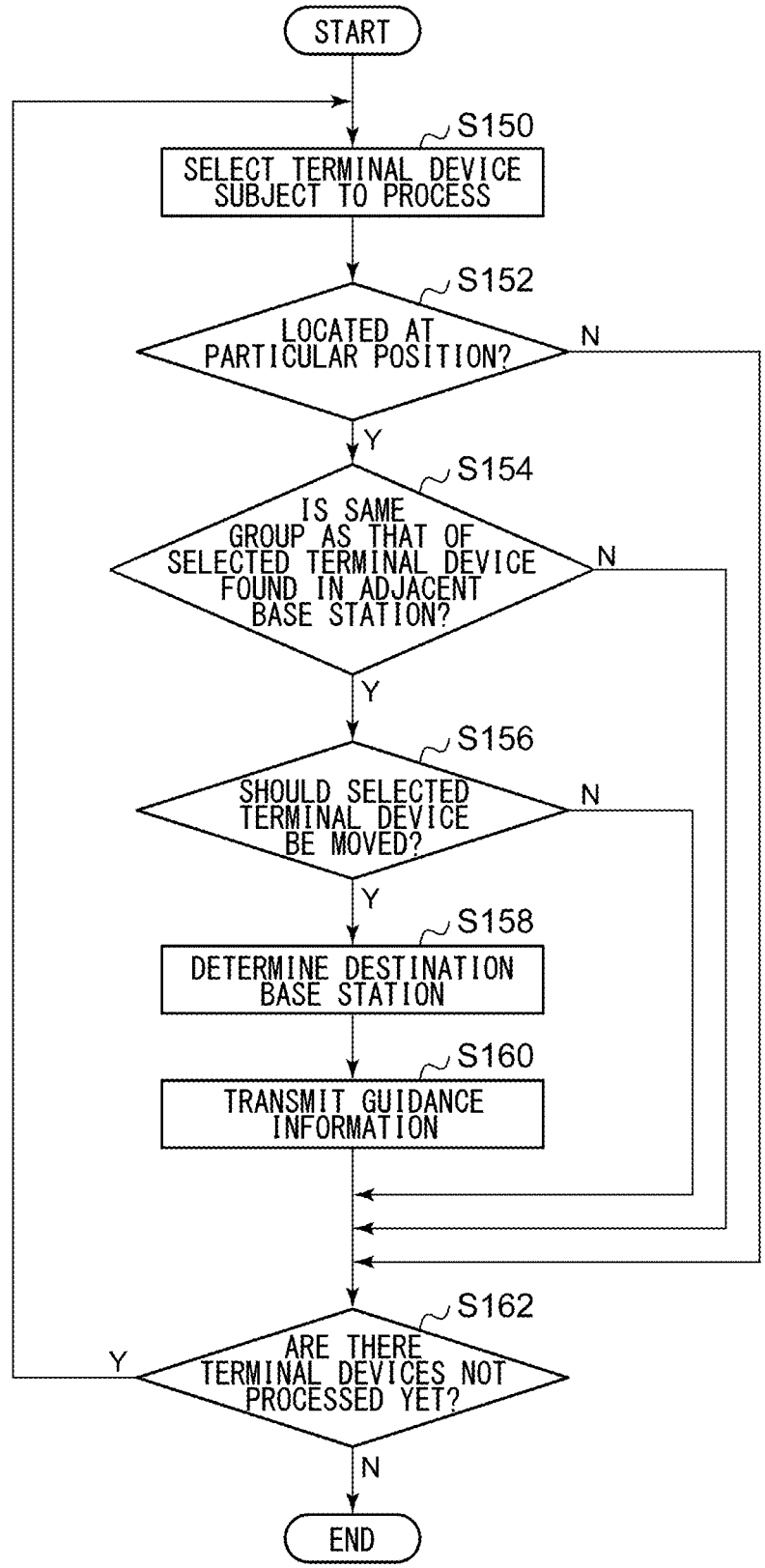
FIG. 26 is a flowchart showing a third sequence of steps performed by the management device according to embodiment 2 to give an instruction.

FIG. 26 is a flowchart showing a third sequence of steps performed by the management device 16 to give an instruction. In step S150, the identification unit 74 selects one terminal device 10 subject to the process. For example, the identification unit 74 may select one terminal device 10 not processed yet from among the terminal devices 10 from which the position information is received. In step S152, the identification unit 74 uses the position information of the terminal device 10 to determine whether that terminal device 10 is located at a particular position. More specifically, identification unit 74 determines whether the terminal device 10 is located at a position where a plurality of base station devices 12 are available for use or in the neighborhood of an area where a plurality of base station devices 12 are available for use. In the example shown in FIG. 24, the terminal devices 10 located in area A110~area D116, and the terminal devices 10 located in the neighborhood of area A110~area D116 meet the condition. For determination as to whether the terminal device 10 is located in the neighborhood, the condition that requires that the shortest distance to the area where a plurality of base station devices 12 are available is equal to or smaller than a predetermined value (e.g., 300 m or less) may be used by way of example. The terminal device 10 that meets this condition would be able to use the base station device 12 different from the base station device 12 currently used relatively easily (by moving a relatively small distance). When the result of determination in step S152 is (Y), control proceeds to step S154. In the subsequent steps, it is assumed that the terminal device 10 located in the neighborhood of area A110~D116 is assumed to be located in one of area A110~D116 at the shortest distance from the terminal device 10 for the purpose of the process.

In step S154, the identification unit 74 determines whether the same group as that of the terminal device 10 subject to the process is found in the base station device 12 not used currently (base station device 12 that is a candidate of destination), in the plurality of base station devices 12 available for use by the terminal device 10 subject to the process. For example, given that the terminal device 10 of group 2 located in area A110 is currently registered in the first base station device 12*a*, the identification unit 74 determines whether group 2 is found in the second base station device 12*b*. When the same group is found, control proceeds to step S156. When it is not found, control proceeds to step S162.

In step S156, the identification unit 74 determines whether to cause the terminal device 10 subject to the process to move to another base station device 12. More specifically, the identification unit 74 determines whether the number of position registrations in the group at the candidate of destination will be larger than the number of position registrations in the group at the source of destination as a result of the terminal device 10 located in the same area as the terminal device 10 subject to the process moving to the base station device 12 that is the candidate of destination. When the condition is met, control proceeds to step S158. When the condition is not met, control proceeds to step S162.

It will be assumed, for example, that the terminal device 10 subject to the process is the terminal device 10 of group 2 located in area A110, three terminal devices 10 belonging to group 2 are located in area A110, and all of these terminal devices 10 are registered in the first base station device 12*a*. In the example shown in FIG. 25, 15 terminal devices 10 belonging to group 2 are registered in the first base station device 12*a*. It will be assumed that three of these terminal devices 10 are located in area A110. If these three are moved to the second base station device 12*b*, the number of position registrations in group 2 in the first base station device 12*a* will be "15−3=12", and the number of position registrations in group 2 in the second base station device 12*b* will be "30+3=33". The identification unit 74 compares "12" with "33" and determines to proceed to step S158 since "33" is larger.

In step S158, the identification unit 74 determines the destination base station device 12. When the number of base station devices 12 that are candidates of destination subjected to the comparison in step S158 is one, the identification unit 74 identifies that base station device 12 as the destination of movement. When there are a plurality of base station devices 12 that are candidates of destination, the identification unit 74 identifies the base station device 12 with the largest number of position registrations in the group as the destination of movement. In step S160, the transmitter 68 transmits the guidance information prompting a movement to the base station device 12 determined in step S158 to the terminal device 10 subject to the process via the baes station device 12 currently used. Even if the terminal device 10 is at a position where a plurality of base station devices 12 are available for use, better communication can be performed by causing the terminal device 10 to move to a position providing better environment for communication with the base station device 12 not currently used. In step S162, the identification unit 74 determines whether there are terminal devices 10 not processed yet. When there are terminal devices 10 not processed yet, control is returned to step S150, whereupon similar steps are repeated.

Figure 27:
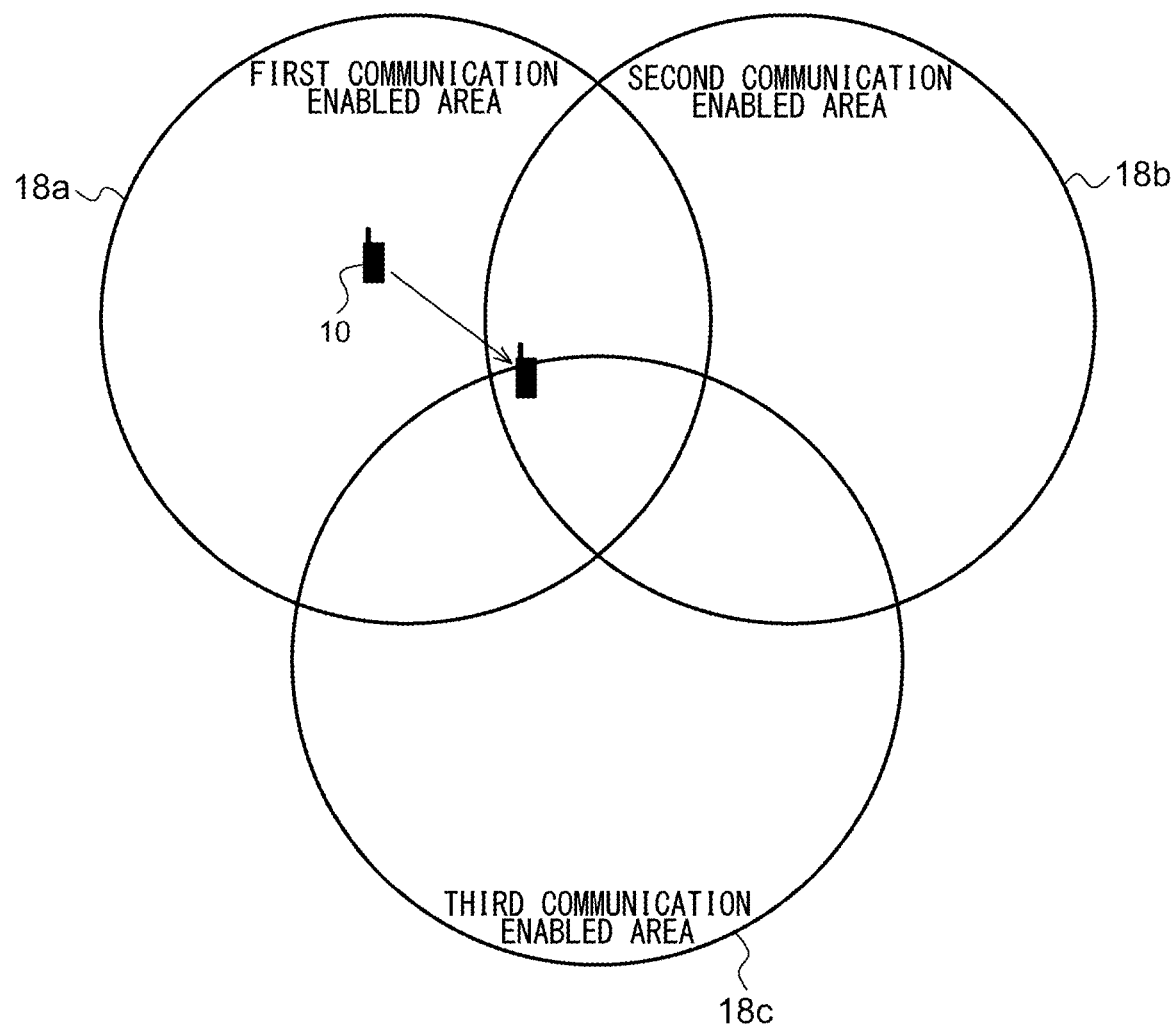
FIG. 27 shows a configuration of the communication system according to embodiment 2.

A description will now be given of a fourth sequence of steps to give an instruction. As in the third sequence of steps to give an instruction, the resources used in the system is reduced by transmitting the guidance information to the terminal device 10 at a position where a plurality of base station devices 12 are available for use or to the terminal device 10 in the neighborhood of the area where a plurality of base station devices 12 are available for use. FIG. 27 shows a configuration of the communication system 100. In this configuration, the terminal device 10 moves from the first communication enabled area 18*a* to where the first communication enabled area 18*a* and the second communication enabled area 18*b* overlap. The terminal device 10 belongs to, for example, group 2. The terminal device registration count database in this case is as shown in FIG. 28. FIG. 28 shows another example of data in the terminal device registration count database stored in the storage unit 60. Since the number of position registrations in group 2 in the first base station device 12*a* is larger than the number of position registrations in group 2 in the second base station device 12*b*, the likelihood of reducing the resources used in the communication system 100 as a whole is increased by the moving terminal device 10 being connected to the second base station device 12*b*.

Figure 29:
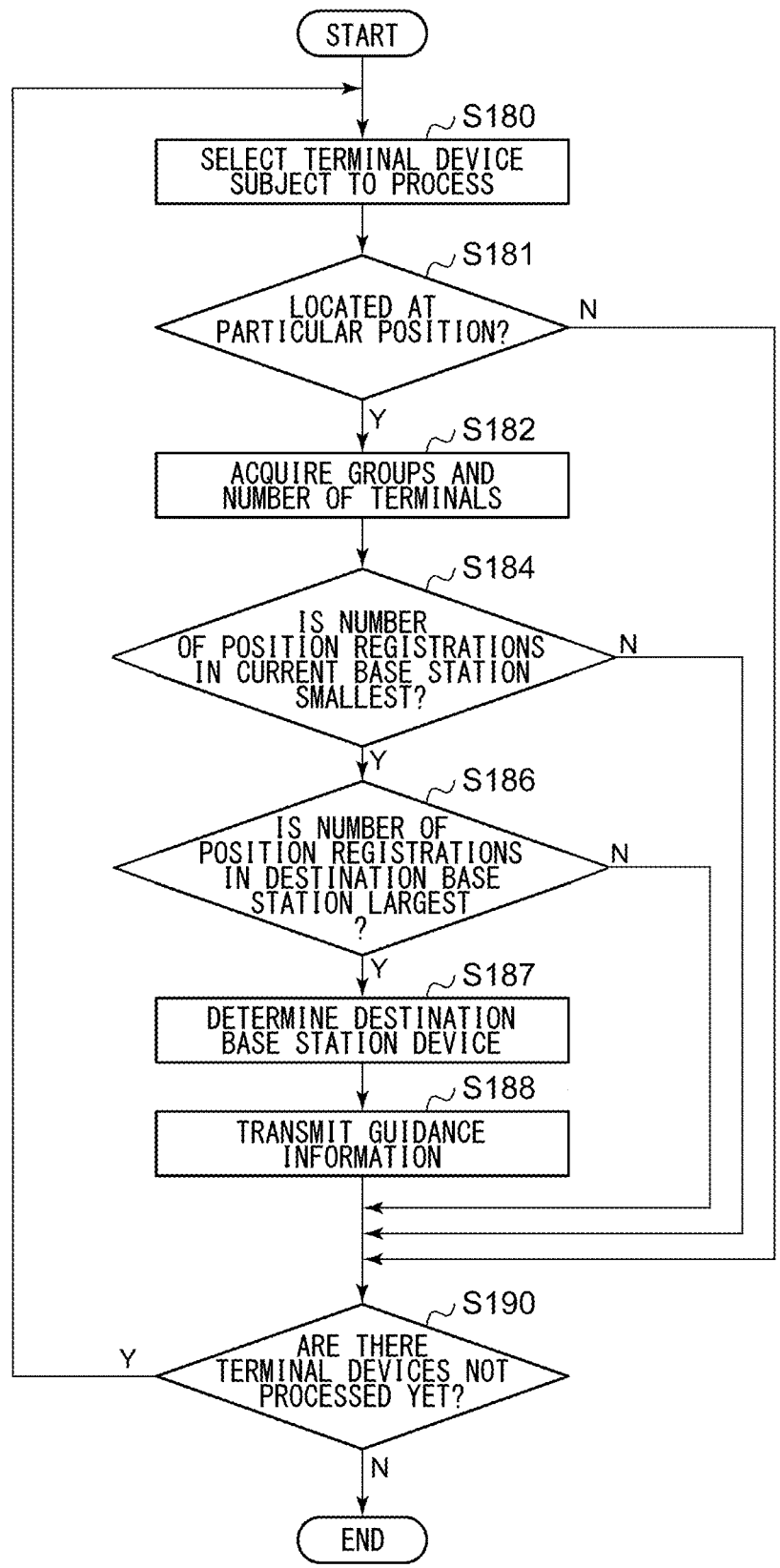
FIG. 29 is a flowchart showing a fourth sequence of steps performed by the management device according to embodiment 2 to give an instruction.

FIG. 29 is a flowchart showing a fourth sequence of steps performed by the management device 16 to give an instruction. In step S180, the identification unit 74 selects one terminal device 10 subject to the process. For example, one terminal device 10 not processed yet may be selected from among the terminal devices 10 from which the position information is received. In step S181, the identification unit 74 uses the position information of the terminal device 10 selected in step S180 to determine whether the terminal device 10 is located at a particular position. More specifically, the identification unit 74 determines whether the terminal device 10 is located at a position where a plurality of base station devices 12 are available for use or whether in the neighborhood of an area where a plurality of base station devices 12 are available for use. This step is similar to step S152. When the result of determination in step S181 is (Y), control proceeds to step S182. When the result of determination is (N), control proceeds to step S190. As described above, it is assumed in the subsequent steps that the terminal device 10 located in the neighborhood of area A110~D116 is assumed to be located in one of area A110~D116 at the shortest distance from the terminal device 10 for the purpose of the process.

In step S182, the acquisition unit 72 acquires the groups used in the base station devices 12 and the number of terminal devices 10 using the groups from the terminal device registration count database. In step S184, the identification unit 74 determines whether the number of position registrations in the group to which the target terminal device 10 belongs is the smallest among the groups registered in the base station device 12 at the source of movement (base station device 12 currently used by the terminal device 10 selected in step S180). When the number is not the smallest, control proceeds to step S190. When the number is the smallest, control proceeds to step S186.

In step S186, the identification unit 74 determines whether the number of position registrations in the group to which the target terminal device 10 belongs is the smallest among the groups registered in the base station device 12 that is a candidate of destination (base station device 12 not currently used among the base station devices 12 available for use by the terminal device 10 selected in step S180). When the number is not the largest, control proceeds to step S190. When the number is the largest, control proceeds to step S187. In step S187, the identification unit 74 determines the destination base station device 12. When the number of base station devices 12 that meet the condition of step S186 is one, the identification unit 74 identifies that base station device 12 as the destination of movement. When there are a plurality of base station devices 12 that are candidates of destination that meet the condition of step S186, the identification unit 74 identifies the base station device 12 with the largest number of position registrations in the group as the destination of movement. In step S188, the transmitter 68 transmits the guidance information prompting a movement to the base station device 12 determined in step S187 to the terminal device 10 subject to the process via the baes station device 12 currently used. In step S190, the identification unit 74 determines whether there are terminal devices 10 not processed yet. When there are terminal devices 10 not processed yet, control is returned to step S180, whereupon similar steps are repeated.

Figure 30:
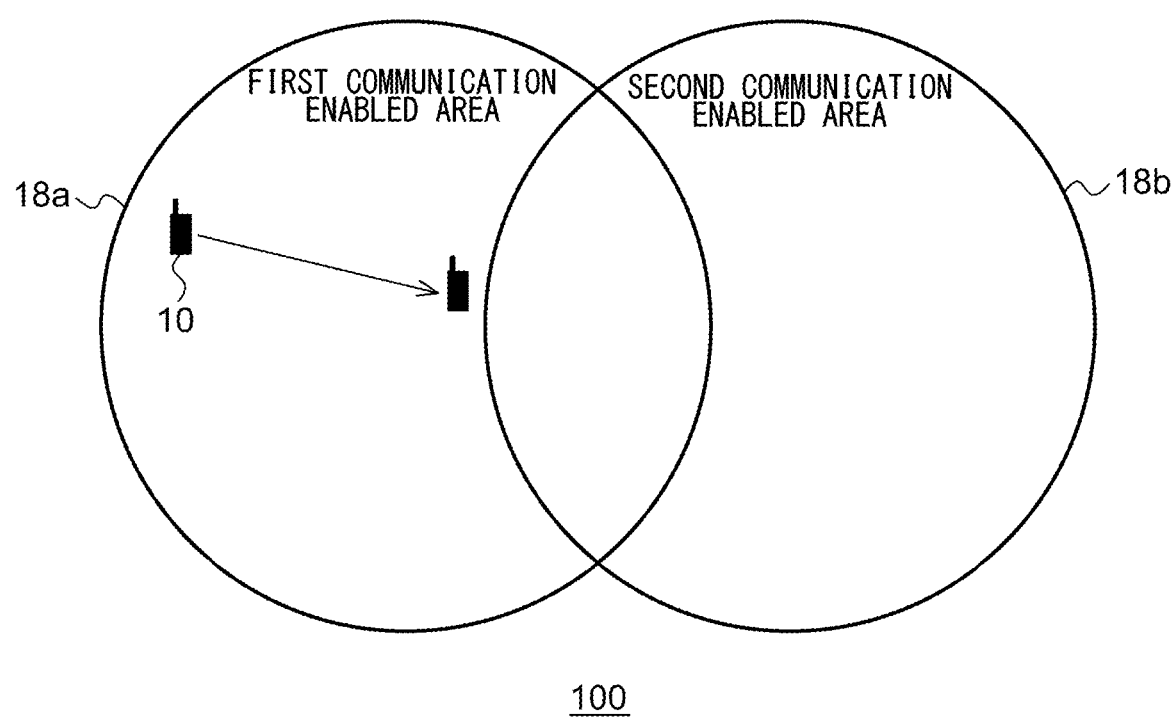
FIG. 30 shows a configuration of the communication system according to embodiment 2.

A description will now be given of a fifth sequence of steps to give an instruction. In this case, the guidance information is transmitted to the terminal device 10 moving in a particular direction. FIG. 30 shows a configuration of the communication system 100. The terminal device 10 using the first base station device 12a is moving from the first communication enabled area 18a to the second communication enabled area 18b. The management device 16 is capable of transmitting the guidance information to the moving terminal device 10 individually. It is assumed that the terminal device registration count database in the storage unit 60 is as shown in FIG. 31. When the moving terminal device 10 belongs to the group with the largest number of position registrations in the base station device 12 currently use, an instruction to stay in the communication enabled area 18 (first communication enabled area 18a) of the current base station device 12 (first base station device 12a) is issued. When the terminal device 10 belongs to the group with the smallest number of position registrations in the base station device 12 currently used (first base station device 12a) and belongs to the group with the largest number of position registrations in the base station device 12 in the direction of travel (second base station device 12b), the guidance information is transmitted to guide the terminal device 10 to move quickly.

Figure 32:
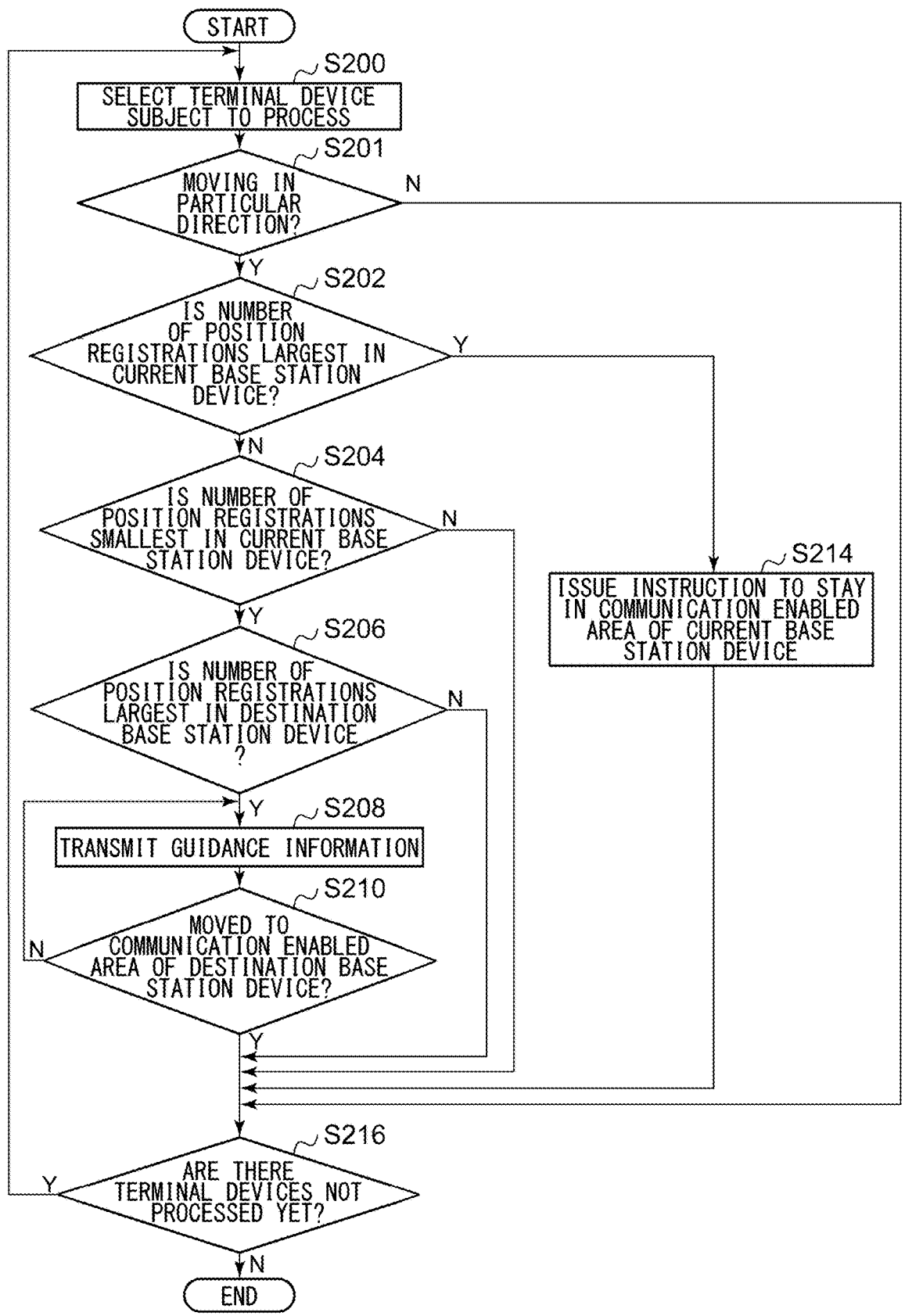
FIG. 32 is a flowchart showing a fifth sequence of steps performed by the management device according to embodiment 2 to give an instruction.

FIG. 32 is a flowchart showing a fifth sequence of steps performed by the management device 16 to give an instruction. In step S200, the identification unit 74 selects one terminal device 10 subject to the process. For example, one terminal device 10 not processed yet may be selected from among the terminal devices 10 from which the position information is received. In step S201, the identification unit 74 determines whether the terminal device 10 selected in step S200 is moving in a particular direction. More specifically, the identification unit 74 uses the track information etc. (history of position information) of the terminal device 10 and determines whether the terminal device 10 is moving in the direction of an area where the communication enabled area 18 of the base station device 12 currently used and the communication enabled area 18 of another base station device 12 overlap. When the terminal device 10 is not moving (N), control proceeds to step S216. When the terminal device 10 moving (Y), the identification unit 74 uses the database of FIG. 31 in step S202 to determine whether the number of position registrations in the group to which the terminal device 10 belongs is the largest in the current base station device 12. When the number of position registrations in the group to which the terminal device 10 in the communication enabled area 18 of the current base station device 12 belongs is the largest (Y), control proceeds to step S214, whereupon a guidance instruction to stay in the communication enabled area 18 of the current base station device 12 is issued.

When the result of determination in step S202 is (N), control proceeds to step S204. In step S204, the identification unit 74 uses the database of FIG. 31 to determine whether the number of position registrations in the group to which the terminal device 10 belongs is the smallest in the current base station device 12. When the number is the smallest, control proceeds to step S206. When the number is not the smallest, control proceeds to step S216. In step S206, the identification unit 74 determines whether the number of position registrations in the group to which the terminal device 10 belongs is the largest in the base station device 12 located at the destination of the direction of movement (second base station device 12b). When the number is the largest, control proceeds to step S208. When the number is not the largest, control proceeds to step S216.

In step S208, the transmitter 68 transmits the guidance information to prompt the terminal device 10 to make a movement to the communication enabled area 18 of the base station device 12 at the destination of the direction of movement (second base station device 12b). In step S210, the identification unit 74 determines whether the terminal device 10 has moved to the communication enabled area 18 of the destination base station device 12. When the movement has not been made, control is returned to step S208 to repeat the steps. In other words, the guidance information is repeatedly transmitted until the terminal device 10 has completely moved to the communication enabled area 18 of the destination base station device 12. Alternatively, step S210 may be omitted. In step S162, the identification unit 74 determines whether there are terminal devices 10 not processed yet. When there are terminal devices 10 not processed yet, control is returned to step 200, whereupon similar steps are repeated. In the fifth sequence of steps to give an instruction, step S202 and step S214 may be omitted so that a guidance instruction to stay in the communication enabled area 18 of the current base station device 12 may not be issued.

According to this embodiment, the guidance information is generated for at least some of the terminal devices belonging to the group subject to the process selected from the groups registered in a given base station device. Therefore, the terminal device is guided to a proper position in consideration of the ease of connection in the communication system. Further, by selecting the group for which the number of terminal devices registered in the given base station device is smaller than a threshold value, the number of base station devices to which a plurality of terminal devices included in the group are connected is reduced. Since the number of base station devices to which a plurality of terminal devices included in the group are connected is reduced, the resource volume (e.g., number of channels) used in the communication system as a whole is reduced. Since the resource volume (e.g., number of channels) used in the communication system as a whole is reduced, a proper communication environment can be provided by efficient operation without resorting to enhancement of facilities. By selecting a group, for which the number of terminal devices registered in another base station device and belonging to the group is larger than the number of terminal devices registered in the given base station device and belonging to the group, the number of base station devices to which a plurality of terminal devices included in the group are connected is reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to embodiments 1, 2, the business wireless system is used in the communication system 100. The type of system is non-limiting, and a wireless communication system other than the business wireless system, such as a cellular phone system, may be used. According to this variation, the flexibility of the system is improved.

According to embodiment 1, 2, the management device 16 is configured to be separate from the base station device 12 and is connected to the base station device 12 via the network 14. The configuration of connection is non-limiting, and the management device 16 may be included in and integrated with the base station device 12. According to this variation, the flexibility of the configuration is improved.

Arbitrary combinations of embodiments 1, 2 are also useful. According to this variation, the benefit from the combination is obtained.

What is claimed is:

1. A management device comprising:
a determination unit that refers to position information of a terminal device registered in a given base station device to determine ease of connection to another base station device; and
a generator that generates guidance information to prompt the terminal device to move to a position where likelihood of connection to the other base station device is increased, based on a result of determination in the determination unit, wherein
the guidance information generated in the generator is information to display an image in which an image of a scenery around captured in the terminal device is superimposed on the guidance information to prompt the terminal device to move to a position where the likelihood of connection to the other base station device is increased.

2. The management device according to claim 1, wherein the guidance information is information indicating a guidance position where the likelihood of connection to the other base station device is increased, a direction from a position of the terminal device toward the guidance information, or a route from the position of the terminal device toward the guidance position.

3. The management device according to claim 2, wherein the guidance information is one of a position of the other base station device, a position where communication with the other base station device is enabled, and a position determined by an electric field intensity of the other base station device.

4. A management device comprising:
a determination unit that refers to position information of a terminal device registered in a given base station device to determine ease of connection to another base station device; and
a generator that generates guidance information to prompt the terminal device to move to a position where likelihood of connection to the other base station device is increased, based on a result of determination in the determination unit,
wherein
the given base station device and the other base station device are base station devices in which groups for group communication are registered,
the management device further comprising:
a selection unit that selects, from the groups registered in the given base station device, one or more groups as a subject of a process, wherein
the determination unit determines ease of connection to the other base station device from at least some terminal devices belonging to the group selected by the selection unit, and
the selection unit selects a group for which the number of terminal devices belonging to the group and registered in the other base station device is larger than the number of terminal devices belonging to the group and registered in the given base station device.

5. The management device according to claim 4, wherein the guidance information generated in the generator is information to display a map on the terminal device to prompt the terminal device to move to a position where the likelihood of connection to the other base station device is increased, the map showing said position.

6. The management device according to claim 4, wherein the guidance information is information indicating a guidance position where the likelihood of connection to the other base station device is increased, a direction from a position of the terminal device toward the guidance information, or a route from the position of the terminal device toward the guidance position.

7. The management device according to claim 6, wherein the guidance information is one of a position of the other base station device, a position where communication with the other base station device is enabled, and a position determined by an electric field intensity of the other base station device.

8. A management device comprising:
a determination unit that refers to position information of a terminal device registered in a given base station device to determine ease of connection to another base station device; and
a generator that generates guidance information to prompt the terminal device to move to a position where likelihood of connection to the other base station device is increased, based on a result of determination in the determination unit,
wherein
the given base station device and the other base station device are base station devices in which groups for group communication are registered, the management device further comprising:
- a selection unit that selects, from the groups registered in the given base station device, one or more groups as a subject of a process, wherein
  the determination unit determines ease of connection to the other base station device from at least some terminal devices belonging to the group selected by the selection unit, and
- the selection unit selects, of a plurality of base station devices forming a communication system, a base station device in which the number of groups registered in the base station device is equal to or larger than a predetermined number or selects a predetermined number of base station devices arranged in the descending order of the number of groups registered in the base station device, and defines one of the base station devices selected as the given base station device.

9. The management device according to claim 8, wherein the guidance information generated in the generator is information to display a map on the terminal device to prompt the terminal device to move to a position where the likelihood of connection to the other base station device is increased, the map showing said position.

10. The management device according to claim 8, wherein
  the guidance information is information indicating a guidance position where the likelihood of connection to the other base station device is increased, a direction from a position of the terminal device toward the guidance information, or a route from the position of the terminal device toward the guidance position.

11. The management device according to claim 10, wherein
  the guidance information is one of a position of the other base station device, a position where communication with the other base station device is enabled, and a position determined by an electric field intensity of the other base station device.

* * * * *